(12) United States Patent
Suda et al.

(10) Patent No.: US 8,297,256 B2
(45) Date of Patent: Oct. 30, 2012

(54) IGNITION CONTROL SYSTEM FOR INTERNAL COMBUSTION ENGINES

(75) Inventors: Shogo Suda, Susono (JP); Nobuhiko Koga, Susono (JP); Nao Murase, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 614 days.

(21) Appl. No.: 12/312,178

(22) PCT Filed: Nov. 27, 2007

(86) PCT No.: PCT/IB2007/003650
§ 371 (c)(1),
(2), (4) Date: Apr. 29, 2009

(87) PCT Pub. No.: WO2008/065511
PCT Pub. Date: Jun. 5, 2008

(65) Prior Publication Data
US 2010/0043749 A1    Feb. 25, 2010

(30) Foreign Application Priority Data
Nov. 29, 2006  (JP) .................................. 2006-322336

(51) Int. Cl.
*F02P 5/00* (2006.01)
(52) U.S. Cl. ........... 123/406.41; 123/179.5; 123/406.55; 123/406.26; 123/406.3
(58) Field of Classification Search ............. 123/406.24, 123/406.25, 406.26, 406.27, 406.41, 406.42, 123/406.43, 406.5, 406.51, 179.5, 406.53, 123/406.55; 701/103, 110, 111
See application file for complete search history.

(56) References Cited

U.S. PATENT DOCUMENTS

| | | | | |
|---|---|---|---|---|
| 2,843,645 A | * | 7/1958 | Sigworth et al. | 123/606 |
| 3,903,856 A | * | 9/1975 | McDougal et al. | 123/406.2 |
| 4,517,943 A | * | 5/1985 | Bert et al. | 123/406.12 |
| 5,133,322 A | * | 7/1992 | McDougal et al. | 123/406.21 |
| 6,334,431 B1 | * | 1/2002 | Kanehiro et al. | 123/406.53 |
| 6,647,948 B2 | * | 11/2003 | Kyuuma et al. | 123/295 |
| 2005/0005908 A1 | | 1/2005 | Tanei et al. | |

FOREIGN PATENT DOCUMENTS

| | | |
|---|---|---|
| DE | 199 32 312 B4 | 2/2006 |
| EP | 1 106 805 A1 | 6/2001 |
| JP | A-05-302535 | 11/1993 |
| JP | A-10-089107 | 4/1998 |
| JP | A-10-318111 | 12/1998 |
| JP | A-2000-240547 | 9/2000 |
| JP | A-2002-195141 | 7/2002 |
| JP | A-2004-028024 | 1/2004 |
| JP | A-2004-239151 | 8/2004 |
| JP | A-2006-112329 | 4/2006 |
| JP | A-2006-112365 | 4/2006 |
| JP | A-2006-242109 | 9/2006 |
| WO | WO 02/31355 A1 | 4/2002 |

* cited by examiner

*Primary Examiner* — Stephen K Cronin
*Assistant Examiner* — Raza Najmuddin
(74) *Attorney, Agent, or Firm* — Oliff & Berridge, PLC

(57) ABSTRACT

An ignition control system for a spark ignition internal combustion engine has: over-advancing means for over-advancing an ignition time for a cylinder of the internal combustion engine beyond an MBT; obtaining means for obtaining an adhering fuel amount that is the amount of fuel that adheres to the inner face of the cylinder of the internal combustion engine; and controlling means for controlling the over-advancing means to execute the ignition time over-advancement when the adhering fuel amount obtained by the obtaining means is equal to or larger than a predetermined amount.

26 Claims, 22 Drawing Sheets

IGNITION CONTROL SYSTEM FOR INTERNAL COMBUSTION ENGINES

BACKGROUND OF THE INVENTION

1. Field of the Invention

The invention relates to a technology for controlling the ignition of a spark ignition internal combustion engine.

2. Description of the Related Art

For example, Japanese Patent Application Publication No. 2000-240547 (JP-A-2000-240547) describes a technology that changes the ignition time of a spark ignition internal combustion engine beyond the MBT (Minimum spark advance for Best Torque) so as to accelerate the increase of the coolant temperature and increase the efficiency of the warming-up of the internal combustion engine.

According to the technology described above, however, because exhaust emissions are not taken into consideration although the warming-up efficiency is, the technology may fail to comply with exhaust-emission regulations that are becoming stricter than ever.

SUMMARY OF THE INVENTION

In view of the above, the invention has been made to provide a technology that enables an ignition control system for a spark ignition internal combustion engine, which can advance the ignition time beyond the MBT, to effectively reduce exhaust emissions.

In order to achieve this object, the invention provides an ignition control system for a spark ignition internal combustion engine that reduces exhaust emissions by utilizing the function of advancing the ignition time beyond the MBT.

When the temperature in each cylinder (will be referred to as "in-cylinder temperature") is low, the injected fuel tends to adhere to the inner face of the cylinder. Most of the fuel that has adhered to the inner face of the cylinder (will be referred to as "adhering fuel") is discharged from the cylinder without being combusted. At this time, if a catalyst provided in the exhaust system of the internal combustion engine has not yet been activated, the fuel that has been discharged from the cylinder without being combusted (will be referred to as "unburned fuel") is discharged to the atmosphere without being purified at the catalyst.

In particular, in the case where the internal combustion engine has been started at an extremely low temperature, it would take a long time before the catalyst is activated after the start of the internal combustion engine, and therefore the amount of the adhering fuel increases accordingly. In this case, therefore, an excessive amount of fuel may be discharged to the atmosphere as unburned fuel.

However, the experiments and studies that have been conducted in connection with this invention have revealed that when the ignition time of a spark ignition internal combustion engine is advanced beyond the MBT, the amount of unburned fuel discharged from the cylinders (e.g., HC) decreases significantly. That is, because the amount of air-fuel mixture that is combusted before the compression stroke top dead center increases when the ignition time is set beyond the MBT, the pressurizing and heating effects obtained by the combustion of air-fuel mixture work in synergy with the pressurizing and heating effects obtained by the upward movement of the piston, so that the peak of the pressure in each cylinder (will be referred to as "in-cylinder pressure") and the peak of the in-cylinder temperature rise. This promotes the vaporization and combustion of the fuel adhering on the inner face of each cylinder (will be referred to as "adhering fuel") and/or the vaporization and combustion of the injected fuel before it reaches the inner face of each cylinder, whereby the amount of unburned fuel discharged from each cylinder decreases significantly.

In view of the above, a first aspect of the invention relates to an ignition control system for a spark ignition internal combustion engine, having: over-advancing means for over-advancing an ignition time for a cylinder of the spark ignition internal combustion engine beyond an MBT; obtaining means for obtaining an adhering fuel amount that is the amount of fuel that adheres to the inner face of the cylinder of the internal combustion engine; and controlling means for controlling the over-advancing means to execute the ignition time over-advancement when the adhering fuel amount obtained by the obtaining means is equal to or larger than a predetermined amount.

According to this structure, because the ignition time is advanced beyond the MBT when the adhering fuel amount is equal to or larger than the predetermined amount, the amount of unburned fuel discharged from each cylinder is reduced. Therefore, even when the catalyst has not yet been activated, the amount of unburned fuel discharged to the atmosphere decreases. As such, the amount of exhaust emissions of the internal combustion engine decreases.

Further, the ignition control system according to the first aspect of the invention may be such that the larger the adhering fuel amount obtained by the obtaining means, the larger the controlling means makes an ignition time over-advancing amount that is the amount by which the over-advancing means advances the ignition time.

The amount of unburned fuel discharged from each cylinder decreases as the ignition time is advanced with respect to the MBT. Therefore, by increasing the ignition time over-advancing amount as the adhering fuel amount increases, the amount of unburned fuel discharged to the atmosphere can be effectively reduced even in a state where the adhering fuel amount tends to become large.

However, if the ignition time is excessively advanced beyond the MBT, the combustion starts before the heating and pressurizing effects of the upward movement of the piston are sufficiently exerted, and therefore the combustion becomes sluggish, resulting in an increase in the heat loss. Further, if the ignition time is excessively advanced beyond the MBT, the thermal energy produced by the combustion of air-fuel mixtures interferes with the upward movement of the piston, which may cause a significant decrease in the output torque of the internal combustion engine.

In view of this, the ignition control system according to the first aspect of the invention may be such that the controlling means sets the ignition time over-advancing amount such that the ignition time is set near a predetermined time.

This "predetermined time" may be, for example, an ignition time with which combustion of air-fuel mixture ends at a time point near the compression stroke top dead center, an ignition time with which the in-cylinder pressure peaks at a time point near the compression stroke top dead center, or an ignition time with which the in-cylinder temperature peaks at a time point near the compression stroke top dead center.

That is, the ignition control system according to the first aspect of the invention may be such that: the controlling means sets the ignition time over-advancing amount such that combustion of air-fuel mixture in the cylinder ends at a time point near a compression stroke top dead center; the controlling means sets the ignition time over-advancing amount such that the pressure in the cylinder reaches a maximum value at a time point near the compression stroke top dead center; or the controlling means sets the ignition time over-advancing amount such that the temperature in the cylinder reaches a maximum value at a time point near the compression stroke top dead center.

By setting the ignition time over-advancing amount as described above, the peak of the in-cylinder pressure and the peak of the in-cylinder temperature can be made as high as possible while suppressing an increase in the heat loss and an excessive decrease in the engine torque.

Further, the controlling means may set the ignition time over-advancing amount such that the ignition time coincides with the foregoing "predetermined time" regardless of the adhering fuel amount obtained by the obtaining means. In this case, the peak of the in-cylinder pressure and the peak of the in-cylinder temperature can be made as high as possible within the range where an increase in the heat loss and an excessive decrease in the engine torque can be suppressed. As such, the amount of unburned fuel discharged from each cylinder can be minimized.

The foregoing "predetermined time" varies depending upon the combustion speed of air-fuel mixture. For example, even when the ignition time is unchanged, the crank angle at which the combustion of air-fuel mixture ends varies as the combustion speed changes. Therefore, the foregoing "predetermined time" may be retarded as the combustion speed increases and may be advanced as the combustion speed decreases.

Further, even when the combustion speed is constant, the crank angle at which the combustion ends varies as the engine speed changes. Therefore, the foregoing "predetermined time" may be set based on a relation between the combustion speed and the engine speed.

Further, the ignition control system according to the first aspect of the invention may be such that the controlling means prohibits execution of the ignition time over-advancement by the over-advancing means (i) when the start-up of the internal combustion engine has not yet been completed, (ii) when the air-fuel ratio of air-fuel mixture combusted in the internal combustion engine is fuel-lean, or (iii) when the load of the internal combustion engine is equal to or greater than a predetermined load.

If the over-advancing means executes the ignition time over-advancement before the start-up of the internal combustion engine has not yet been completed, it may cause some drawbacks, such as a reduction of the ignitability and an increase in the necessary cranking torque, and in some cases, the internal combustion engine may fail to be started promptly. Therefore, by prohibiting execution of the ignition time over-advancement until the start-up of the internal combustion engine is completed, the aforementioned reduction of the engine startability can be avoided.

Meanwhile, the start-up of the internal combustion engine may be regarded as being "complete" when the internal combustion engine has started to run with full combustion. Alternatively, if the ignition time advancing amount is small, the start-up of the internal combustion engine may be regarded as being complete when the initial combustion occurs.

When the air-fuel ratio of air-fuel mixture combusted in each cylinder is fuel-lean, the amount of unburned fuel discharged from each cylinder is small, and the unburned fuel in the exhaust gas reacts with oxygen at the catalyst, whereby the catalyst quickly heats up to its activation temperature range. Thus, exhaust emissions decrease even if the over-advancing means does not execute the ignition time over-advancement.

Meanwhile, if the over-advancing means executes the ignition time over-advancement when the load of the internal combustion engine is equal to or greater than the predetermined load, the output torque of the internal combustion engine may become smaller than the required torque. Thus, in order to ensure that the internal combustion engine produces the required torque, the controlling means may prohibit execution of the ignition time over-advancement by the over-advancing means when the load of the internal combustion engine is equal to or greater than the predetermined load.

Further, the ignition control system according to the first aspect of the invention may further include a fuel injection valve for injecting fuel into an intake port of the internal combustion engine, wherein when the ignition time over-advancement is executed by the over-advancing means, the controlling means sets the fuel injection time of the fuel injection valve to a time point synchronous with an intake stroke (intake-synchronous fuel injection mode).

It is considered that the temperature in each intake port is low when the in-cylinder temperature is low. If the fuel injection time is set to a time point that is non-synchronous with an intake stroke (intake-non-synchronous fuel injection mode) when the in-cylinder temperature and the temperature in each intake port are low, the amount of fuel that adheres to the inner face of each intake port increases, as well as the fuel that adheres to the inner face of each cylinder.

Thus, if the fuel injection time is set to a time point synchronous with an intake stroke when the ignition time over-advancement is executed by the over-advancing means, the amount of fuel that adheres to the inner face of each intake port can be reduced without increasing the amount of unburned fuel discharged from each cylinder.

Further, the ignition control system according to the first aspect of the invention may further include a fuel injection valve for injecting fuel into an intake port of the internal combustion engine, wherein the controlling means switches the fuel injection time of the fuel injection valve from a time point not synchronous with the intake stroke to a time point synchronous with the intake stroke after the over-advancing means starts executing the ignition time over-advancement.

When the fuel injection time is set to the time point synchronous with the intake stroke, the amount of fuel that adheres to the inner face of each cylinder tends to increase even though the amount of fuel that adheres to the inner face of each intake port tends to decrease, as compared to when the fuel injection time is set to the time point non-synchronous with the intake stroke. Further, because the in-cylinder temperature is low immediately after the start of the ignition time over-advancement by the over-advancing means, if an excessive amount of fuel adheres to the inner face of each cylinder, the adhering fuel can not be vaporized and combusted entirely.

Therefore, if the fuel injection time is switched from the time point not synchronous with the intake stroke to the time point synchronous with the intake stroke at the time of starting the ignition time over-advancement by the over-advancing means, it may result in a difficulty in effectively reducing the unburned fuel discharged from each cylinder.

To cope with this, if the fuel injection time is switched from the time point not synchronous with the intake stroke to the time point synchronous with the intake stroke after the over-advancing means starts the ignition time over-advancement, the switching of the fuel injection time occurs after the in-cylinder temperature has increased to some extent, and therefore the fuel that adheres to the inner face of each cylinder is unlikely to increase to an excessive level, and thus the adhering fuel can be entirely vaporized and combusted.

As such, by switching the fuel injection time from the time point not synchronous with the intake stroke to the time point synchronous with the intake stroke after the over-advancing means starts the ignition time over-advancement, the amount of unburned fuel discharged from each cylinder can be effectively reduced.

Further, the ignition control system according to the first aspect of the invention may be such that the controlling means gradually changes the ignition time when starting the ignition time over-advancement by the over-advancing means and/or when finishing the ignition time over-advancement by the over-advancing means.

Further, the ignition control system according to the first aspect of the invention may be such that the controlling means adjusts an intake air amount while the ignition time over-advancement is being executed by the over-advancing means.

Further, the ignition control system according to the first aspect of the invention may be such that the controlling means calculates a combustion state variation rate from the pressure in the cylinder and corrects an ignition time over-advancing amount such that the combustion state variation rate becomes equal to or lower than a threshold.

A second aspect of the invention relates to an ignition control system for a spark ignition internal combustion engine, having: over-advancing means for over-advancing an ignition time for a cylinder of the internal combustion engine beyond an MBT; obtaining means for obtaining an adhering fuel amount that is the amount of fuel that adheres to the inner face of the cylinder of the internal combustion engine; and controlling means for changing an ignition time over-advancing amount, which is the amount by which the over-advancing means advances the ignition time, in accordance with the adhering fuel amount obtained by the obtaining means.

Further, the ignition control system according to the second aspect of the invention may be such that the larger the adhering fuel amount obtained by the obtaining means, the larger the controlling means makes the ignition time over-advancing amount.

Advancing the ignition time beyond the MBT reduces the engine torque and the fuel economy. One option to cope with this issue is to minimize the ignition time over-advancing amount when the adhering fuel amount is small.

Thus, if the ignition time over-advancing amount is changed in accordance with the adhering fuel amount, the amount of unburned fuel discharged from each cylinder can be reduced while minimizing the reduction of the engine torque and the reduction of the fuel economy.

Meanwhile, because advancing the ignition time excessively may lead to an increase in the heat loss and a decrease in the engine torque as mentioned above, the ignition control system of the second example embodiment may be such that the controlling means limits the ignition time over-advancing amount such that the ignition time does not become earlier than a predetermined time. This "predetermined time" may be, for example, an ignition time with which combustion of air-fuel mixture ends at a time point near the compression stroke top dead center, an ignition time with which the in-cylinder pressure peaks at a time point near the compression stroke top dead center, or an ignition time with which the in-cylinder temperature peaks at a time point near the compression stroke top dead center.

That is, the ignition control system according to the second aspect of the invention may be such that: the controlling means limits the ignition time over-advancing amount such that combustion of air-fuel mixture in the cylinder ends at or after a time point near a compression stroke top dead center; the controlling means limits the ignition time over-advancing amount such that the pressure in the cylinder reaches a maximum value at or after a time point near the compression stroke top dead center; or the controlling means limits the ignition time over-advancing amount such that the temperature in the cylinder reaches a maximum value at or after a time point near the compression stroke top dead center.

Further, the ignition control system according to the second aspect of the invention may be such that the controlling means prohibits execution of the ignition time over-advancement by the over-advancing means (i) when the start-up of the internal combustion engine has not yet been completed, (ii) when the air-fuel ratio of air-fuel mixture combusted in the internal combustion engine is fuel-lean, or (iii) when the load of the internal combustion engine is equal to or greater than a predetermined load.

Further, the ignition control system according to the second aspect of the invention may further include a fuel injection valve for injecting fuel into an intake port of the internal combustion engine, wherein when the ignition time over-advancement is executed by the over-advancing means, the controlling means sets the fuel injection time of the fuel injection valve to a time point synchronous with an intake stroke.

Further, the ignition control system according to the second aspect of the invention may further include a fuel injection valve for injecting fuel into an intake port of the internal combustion engine, wherein the controlling means switches the fuel injection time of the fuel injection valve to a time point synchronous with the intake stroke after the over-advancing means starts executing the ignition time over-advancement.

Further, the ignition control system according to the second aspect of the invention may be such that the controlling means gradually changes the ignition time when starting the ignition time over-advancement by the over-advancing means and/or when finishing the ignition time over-advancement by the over-advancing means.

Further, the ignition control system according to the second aspect of the invention may be such that the controlling means adjusts an intake air amount while the ignition time over-advancement is being executed by the over-advancing means.

Further, the ignition control system according to the second aspect of the invention may be such that the controlling means calculates a combustion state variation rate from the pressure in the cylinder and corrects an ignition time over-advancing amount such that the combustion state variation rate becomes equal to or lower than a threshold.

A third aspect of the invention relates to an ignition control system for a spark ignition internal combustion engine, having: over-advancing means for over-advancing an ignition time for a cylinder of the spark ignition internal combustion engine beyond an MBT; and controlling means for setting an ignition time over-advancing amount, which is the amount by which the over-advancing means advances the ignition time, such that combustion of air-fuel mixture in the cylinder ends at a time point near a compression stroke top dead center.

According to this structure, during the ignition time over-advancement by the over-advancing means, the combustion of air-fuel mixture ends near the compression stroke top dead center. Therefore, the peak values of the in-cylinder pressure and the in-cylinder temperature can be made as high as possible while suppressing an increase in the heat loss and an excessive decrease in the engine torque. As such, the amount of unburned fuel discharged from each cylinder can be minimized.

Further, the ignition control system according to the third aspect of the invention may be such that the controlling means obtains the combustion speed of the air-fuel mixture in the cylinder and determines, based on the obtained combustion speed, a value of the ignition time over-advancing amount with which the combustion of the air-fuel mixture in the cylinder ends at the time point near the compression stroke top dead center.

Further, the ignition control system according to the third aspect of the invention may be such that the controlling means prohibits execution of the ignition time over-advancement by the over-advancing means (i) when the start-up of the internal combustion engine has not yet been completed, (ii) when the air-fuel ratio of air-fuel mixture combusted in the internal combustion engine is fuel-lean, or (iii) when the load of the internal combustion engine is equal to or greater than a predetermined load.

Further, the ignition control system according to the third aspect of the invention may further include a fuel injection valve for injecting fuel into an intake port of the internal combustion engine, wherein when the ignition time over-advancement is executed by the over-advancing means, the controlling means sets the fuel injection time of the fuel injection valve to a time point synchronous with an intake stroke.

Further, the ignition control system according to the third aspect of the invention may further include a fuel injection valve for injecting fuel into an intake port of the internal combustion engine, wherein the controlling means switches the fuel injection time of the fuel injection valve to a time point synchronous with the intake stroke after the over-advancing means starts executing the ignition time over-advancement.

Further, the ignition control system according to the third aspect of the invention may be such that the controlling means gradually changes the ignition time when starting the ignition time over-advancement by the over-advancing means and/or when finishing the ignition time over-advancement by the over-advancing means.

Further, the ignition control system according to the third aspect of the invention may be such that the controlling means adjusts an intake air amount while the ignition time over-advancement is being executed by the over-advancing means.

Further, the ignition control system according to the third aspect of the invention may be such that the controlling means calculates a combustion state variation rate from the pressure in the cylinder and corrects an ignition time over-advancing amount such that the combustion state variation rate becomes equal to or lower than a threshold.

A fourth aspect of the invention relates to an ignition control system for a spark ignition internal combustion engine, having: over-advancing means for over-advancing an ignition time for a cylinder of the internal combustion engine beyond an MBT; and controlling means for controlling the over-advancing means to execute the ignition time over-advancement after a start-up of the internal combustion engine is completed.

According to this structure, the ignition time over-advancement is not executed before the start-up of the internal combustion engine is completed. Therefore, the reduction of the engine startability that may other be caused by the ignition time being advanced beyond the MBT can be prevented.

The ignition time over-advancement by the over-advancing means may either be automatically started after the start-up of the internal combustion engine is completed or started only in a state where the adhering fuel is likely to increase. In either case, the amount of unburned fuel discharged from the internal combustion engine to the atmosphere, can be made extremely small during the time period from when the start-up of the internal combustion engine is completed to when the catalyst is activated.

The "state where the adhering fuel amount is likely to increase" is, for example, when the adhering fuel amount obtained by the obtaining means has exceeded the predetermined value and when the coolant temperature is low.

The ignition time over-advancing amount may be changed in accordance with the adhering fuel amount or may be set such that the ignition time coincides with the foregoing "predetermined time".

That is, the ignition control system according to the fourth aspect of the invention may further include obtaining means for obtaining an adhering fuel amount that is the amount of fuel that adheres to an inner surface of the cylinder of the internal combustion engine, wherein the larger the adhering fuel amount obtained by the obtaining means, the larger the controlling means makes an ignition time over-advancing amount, which is the amount by which the over-advancing means advances the ignition time.

That is, the ignition control system according to the fourth aspect of the invention may be such that: the controlling means sets the ignition time over-advancing amount such that combustion of air-fuel mixture in the cylinder ends at a time point near a compression stroke top dead center; the controlling means sets the ignition time over-advancing amount such that the pressure in the cylinder reaches a maximum value at a time point near the compression stroke top dead center; or the controlling means sets the ignition time over-advancing amount such that the temperature in the cylinder reaches a maximum value at a time point near the compression stroke top dead center.

Further, the ignition control system according to the fourth aspect of the invention may be such that the controlling means prohibits execution of the ignition time over-advancement by the over-advancing means (i) when the air-fuel ratio of air-fuel mixture combusted in the internal combustion engine is fuel-lean, or (ii) when the load of the internal combustion engine is equal to or greater than a predetermined load.

Further, the ignition control system according to the fourth aspect of the invention may further include a fuel injection valve for injecting fuel into an intake port of the internal combustion engine, wherein when the ignition time over-advancement is executed by the over-advancing means, the controlling means sets the fuel injection time of the fuel injection valve to a time point synchronous with an intake stroke.

Further, the ignition control system according to the fourth aspect of the invention may further include a fuel injection valve for injecting fuel into an intake port of the internal combustion engine and the controlling means may switch the fuel injection time of the fuel injection valve to a time point synchronous with the intake stroke after the over-advancing means starts executing the ignition time over-advancement.

Further, the ignition control system according to the fourth aspect of the invention may be such that the controlling means gradually changes the ignition time when starting the ignition time over-advancement by the over-advancing means and/or when finishing the ignition time over-advancement by the over-advancing means.

Further, the ignition control system according to the fourth aspect of the invention may be such that the controlling means adjusts an intake air amount while the ignition time over-advancement is being executed by the over-advancing means.

Further, the ignition control system according to the fourth aspect of the invention may be such that the controlling means calculates a combustion state variation rate from the pressure in the cylinder and corrects an ignition time over-advancing amount such that the combustion state variation rate becomes equal to or lower than a threshold.

As such, the ignition control systems according to the invention effectively reduce the exhaust emissions from a spark ignition internal combustion engine in which the ignition time is advanced beyond the MBT when required.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EMBODIMENTS

Hereinafter, example embodiments of the invention will be described with reference to the drawings.

First Example Embodiment

Figure 1:
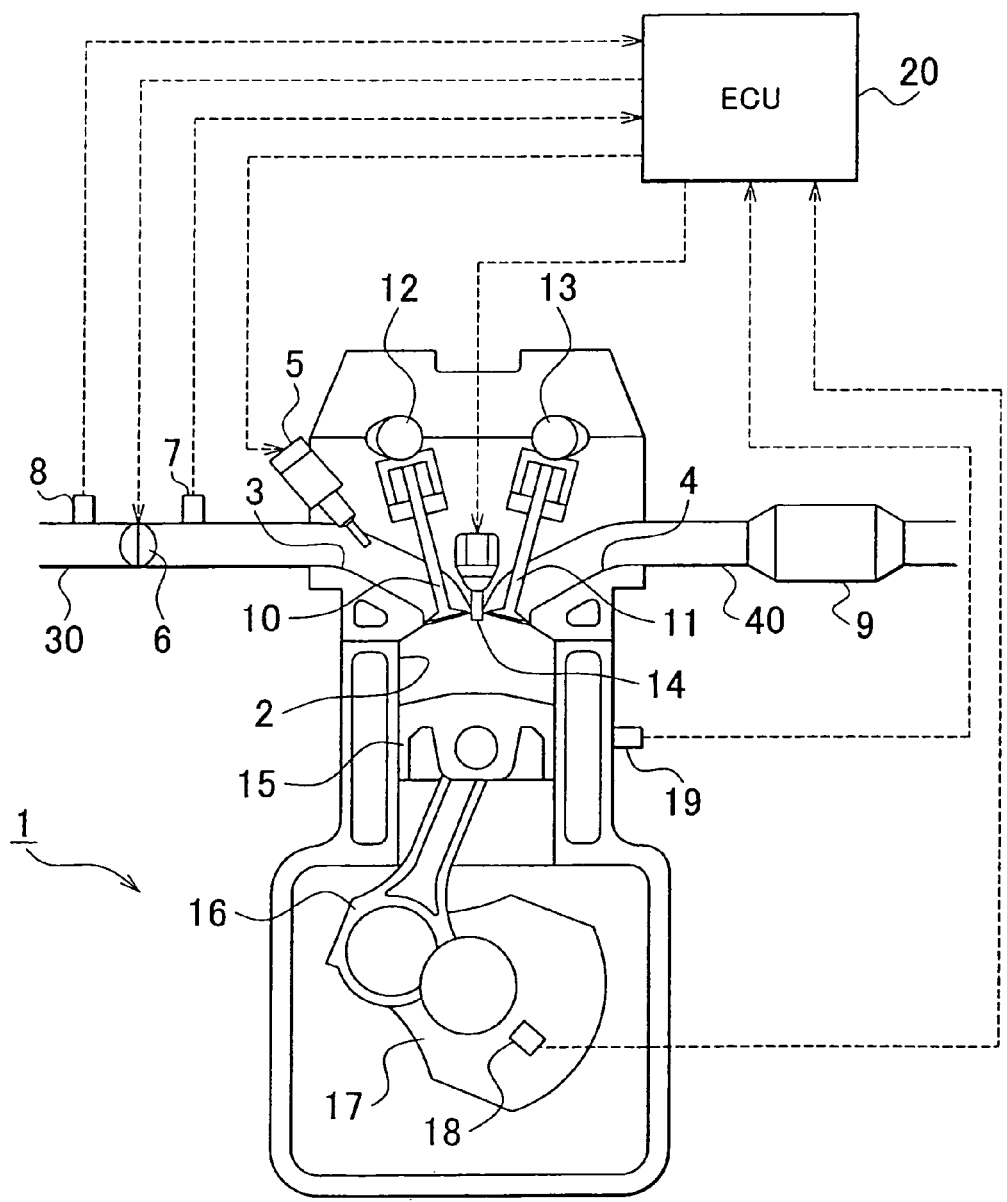
FIG. 1 is a view schematically showing the configuration of an internal combustion engine incorporating an ignition control system according to the invention.

To begin with, the first example embodiment of the invention will be described with reference FIG. 1 to FIG. 15. FIG. 1 is a view schematically showing the structure of an ignition control system for an internal combustion engine according to the first example embodiment of the invention.

The internal combustion engine 1 shown in FIG. 1 is a spark-ignition four-stroke internal combustion engine (gasoline engine). The internal combustion engine 1 has a plurality of cylinders 2, each of which is connected to an intake passage 30 via a corresponding intake port 3 and to an exhaust passage 40 via a corresponding exhaust port 4.

In each intake port 3, a fuel injection valve 5 is provided which injects fuel into the cylinder 2. In the intake passage 30, a throttle valve 6 is provided which is used to control the amount of air distributed via the intake passage 30. An intake pressure sensor 7 is provided downstream of the throttle valve 6 in the intake passage 30. The intake pressure sensor 7 detects the pressure in the intake passage 30 (i.e., intake pressure). An airflow meter 8 is provided upstream of the throttle valve 6 in the intake passage 30. The airflow meter 8 detects the amount of air flowing in the intake passage 30.

An exhaust gas purification device 9 is provided in the exhaust passage 40. The exhaust gas purification device 9 is provided with a three-way catalyst, an adsorption-reduction type NOx catalyst, or the like, and purifies the exhaust gas when the temperature of the exhaust gas purification device 9 is within a given activation temperature range.

Further, the internal combustion engine 1 is provided with intake valves 10 for opening and closing the openings of the intake ports 3 communicating with the respective cylinders 2 and exhaust valves 11 for opening and closing the openings of the exhaust ports 4 communicating with the respective cylinders 2. The intake valves 10 and the exhaust valves 11 open and close by being driven by an intake camshaft 12 and an exhaust camshaft 13, respectively.

In the upper area of each cylinder 2 is provided an ignition plug 14 which ignites an air-fuel mixture in the cylinder 2. Further, a piston 15 is slidably arranged in each cylinder 2. The pistons 15 are connected to a crankshaft 17 via corresponding connecting rods 16.

A crank position sensor 18 is provided near the crankshaft 17. The crank position sensor 18 detects the rotation speed of the crankshaft 17. Further, a coolant temperature sensor 19 is attached to the internal combustion engine 1. The coolant temperature sensor 19 detects the temperature of the coolant circulated in the internal combustion engine 1.

The internal combustion engine 1 configured as described above is controlled by an ECU 20. The ECU 20 is an electronic control unit having a CPU (Central Processing Unit), a ROM (Read Only Memory), a RAM (Random Access Memory), etc. The ECU 20 is electrically connected to various sensors, such as the intake pressure sensor 7, the airflow meter 8, the crank position sensor 18, and the coolant temperature sensor 19, and the ECU 20 obtains the values detected by these sensors.

The ECU 20 electrically controls the fuel injection valves 5, the throttle valve 6, and the ignition plugs 14 based on the values detected by the respective sensors. For example, the ECU 20 executes an adhering fuel reduction control for reducing the amount of fuel that adheres to the inner surface of each cylinder 2.

Hereinafter, the adhering fuel reduction control of the first example embodiment will be described.

When the temperature in each cylinder 2 is low (e.g., when the temperature of the internal combustion engine 1 is low), the injected fuel tends to adhere to the inner face of the cylinder 2. Most of the fuel that has adhered to the inner face of the cylinder 2 (will be referred to as "adhering fuel") is discharged as unburned fuel from the cylinder 2 without being combusted. At this time, if the exhaust gas purification device 9 has not yet been heated up to its activation temperature range, the unburned fuel is discharged to the atmosphere without being purified.

In particular, for example, in the case where the internal combustion engine 1 has been started at an extremely low temperature, it would take a long time before the exhaust gas purification device 9 is activated after the start of the internal combustion engine 1, and therefore the amount of the adhering fuel increases accordingly. In this case, therefore, an excessive amount of fuel may be discharged to the atmosphere as unburned fuel.

To cope with this, in the adhering fuel reduction control, when the amount of the adhering fuel becomes large, the ECU 20 advances the time each ignition plug 14 is sparked (will be referred to as "ignition time") beyond the MBT so that the amount of the adhering fuel decreases and thus the amount of unburned fuel discharged from each cylinder 2 decreases.

Figure 2:
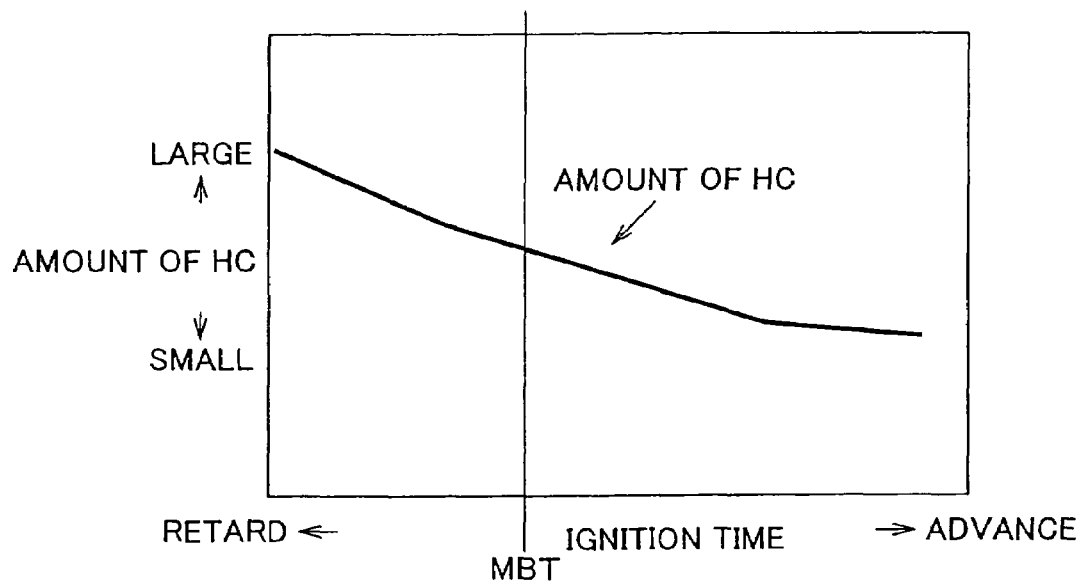
FIG. 2 is a chart illustrating the relation between the amount of unburned fuel (HC) discharged from the cylinders of the internal combustion engine according to the invention and the ignition time.

As a result of the experiments and studies conducted in connection with this invention, it has been revealed that when the ignition time is advanced beyond the MBT, the more the ignition time is advanced, the amount of unburned fuel (HC) discharged from each cylinder 2 decreases, as indicated in FIG. 2.

Although the mechanism of this phenomenon has not yet been clarified, the following mechanism is considered to exist.

Figure 3:
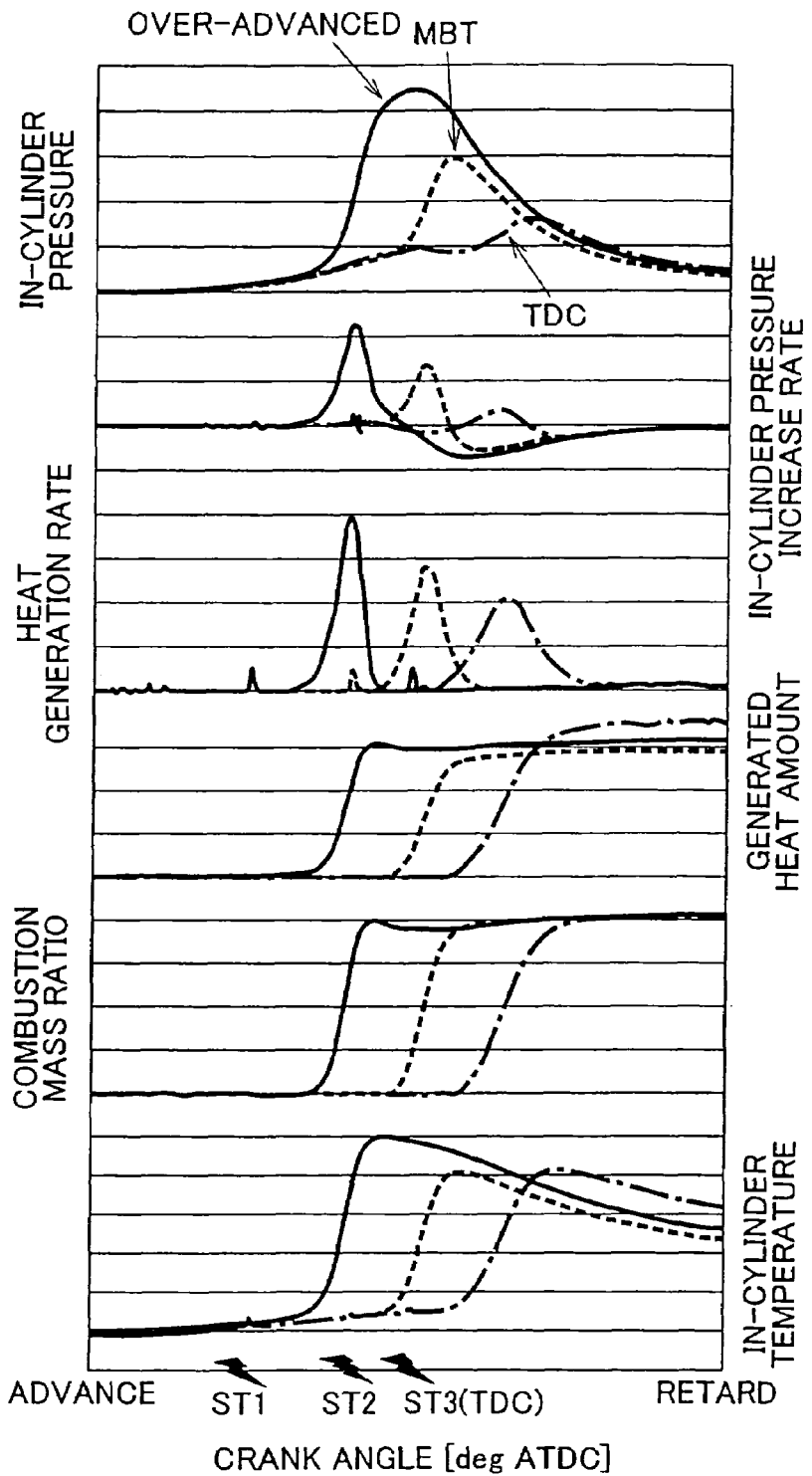
FIG. 3 is a chart illustrating the relation between the ignition time and the state in each cylinder in the internal combustion engine according to the invention.
Figure 4:
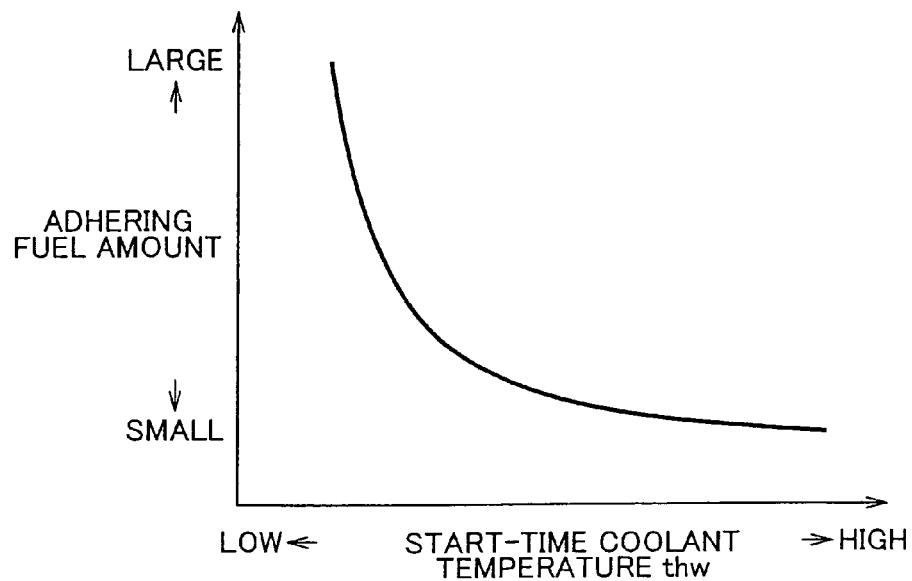
FIG. 4 is a chart illustrating the relation between the temperature of the coolant at the engine start and the adhering fuel amount in the internal combustion engine according to the invention.

FIG. 3 illustrates the results of measurement on the state in each cylinder 2, which were obtained in the case where the ignition time was advanced to a time point ("ST1" in FIG. 3) earlier than the MBT, the case where the ignition time was set to the MBT ("ST2 in FIG. 3), and the case where the ignition time was set to the compression stroke top dead center (TDC) ("ST3" in FIG. 3), respectively. In FIG. 3, the solid curves represent the values obtained when the ignition time was advanced beyond the MBT, the broken curves represent the values obtained when the ignition time was set to the MBT, and the single-dotted curves represent the values obtained when the ignition time was set to the compression stroke bottom dead center (TDC). In the following, advancing the ignition time to a time point earlier than the MBT will be referred to as "over-advancing".

Referring to FIG. 3, when the ignition time was over-advanced beyond the MBT, the amount of air-fuel mixture combusted before the compression stroke top dead center was large as compared to when the ignition time was set to the MBT and to when the ignition time was set to the compression stroke top dead center (TDC). Therefore, the peak of the thermal energy produced by the combustion of air-fuel mixture shifts to a certain point before the compression stroke top dead center (Refer to "HEAT GENERATION RATE", "GENERATED HEAT AMOUNT", and "COMBUSTION MASS RATIO" in FIG. 3).

Thus, due to the synergy of the heating effect and the pressurizing effect obtained by the combustion of air-fuel mixtures and the compressing effect obtained by the upward movement of the piston 15 (the piston movement from the bottom dead center to the top dead center), the peak value of the pressure in each cylinder 2 (will be referred to as "in-cylinder pressure") and the peak value of the temperature in each cylinder 2 (will be referred to as "in-cylinder temperature") during the time period from the compression stroke to the power stroke increase significantly, which helps vaporize and combust the fuel adhering on the inner face of each cylinder 2 and/or helps vaporize and combust the injected fuel before it reaches the inner face of each cylinder 2.

Thus, the ECU 20 obtains the amount of the adhering fuel, and if the obtained adhering fuel amount is equal to or larger than a predetermined amount, the ECU 20 over-advances the ignition time of each ignition plug 14 beyond the MBT.

The following are examples of a method for obtaining the adhering fuel amount. The first method is to provide, in each cylinder 2, a sensor for optically measuring the thickness of a liquid membrane and detect the adhering fuel amount using the same sensor. The second method is to provide a conductivity sensor in each cylinder 2 and obtain the adhering fuel amount by converting the values detected by the conductivity sensor. The third method is to estimate the adhering fuel amount from the operation condition of the internal combustion engine 1 (will hereinafter be referred to as "engine operation condition").

As an example for estimating the adhering fuel amount from the engine operation condition, the ECU 20 may estimate the adhering fuel amount using, as a parameter, at least one of the value detected by the coolant temperature 19 (coolant temperature thw), the value detected by the intake pressure sensor 7 (intake pressure pm), the cumulative intake air amount from the start of the internal combustion engine 1 to the present time (ΣGa), the cumulative fuel injection amount from the start of the internal combustion engine 1 to the present time (ΣQinj), the fuel injection amount (Qinj), and the air-fuel ratio of air-fuel mixture (A/F).

The coolant temperature thw is considered to be substantially equal to the temperature of the inner face of each cylinder 2, for example, at the time of starting the internal combustion engine 1 (will be referred to as "engine start time"). The lower the temperature of the inner face of each cylinder 2, the larger the adhering fuel amount becomes. Therefore, the ECU 20 can estimate the adhering fuel amount by applying the coolant temperature thw at the engine start time to the map shown in FIG. 4.

Because the temperature of the inner face of each cylinder 2 at the engine start time is substantially equal to the temperature of the atmosphere, if the internal combustion engine 1 is provided with an intake temperature sensor, the value detected by the intake temperature sensor may be used instead of the coolant temperature thw at the engine start time.

Figure 5:
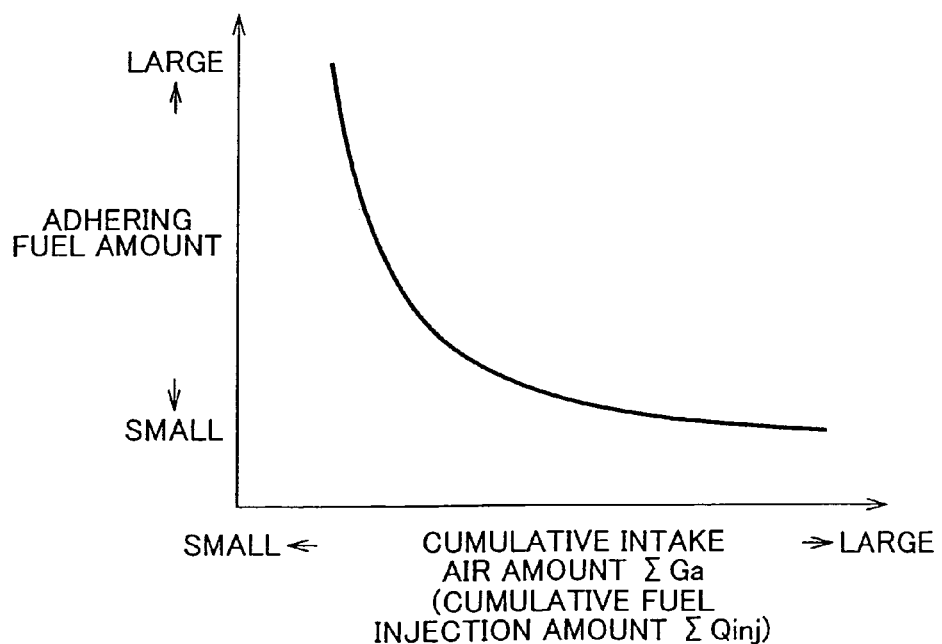
FIG. 5 is a chart illustrating the relation between the in-cylinder pressure and the adhering fuel amount in the internal combustion engine according to the invention.
Figure 6:
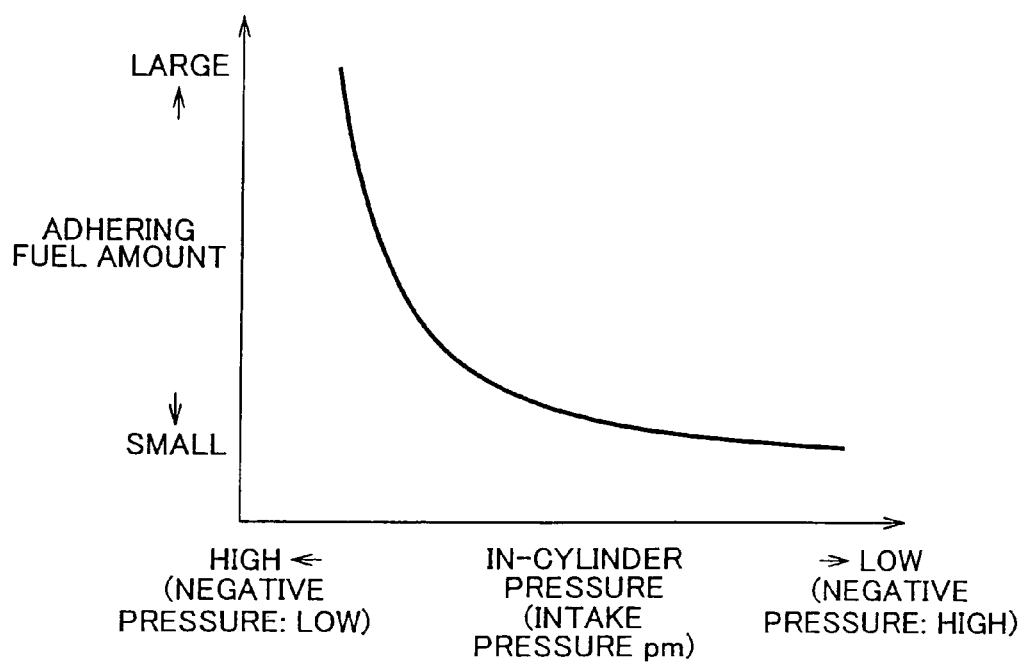
FIG. 6 is a chart illustrating the relation between the cumulative amount of intake air that has been drawn into the internal combustion engine according to the invention from the engine start and the adhering fuel amount.
Figure 7:
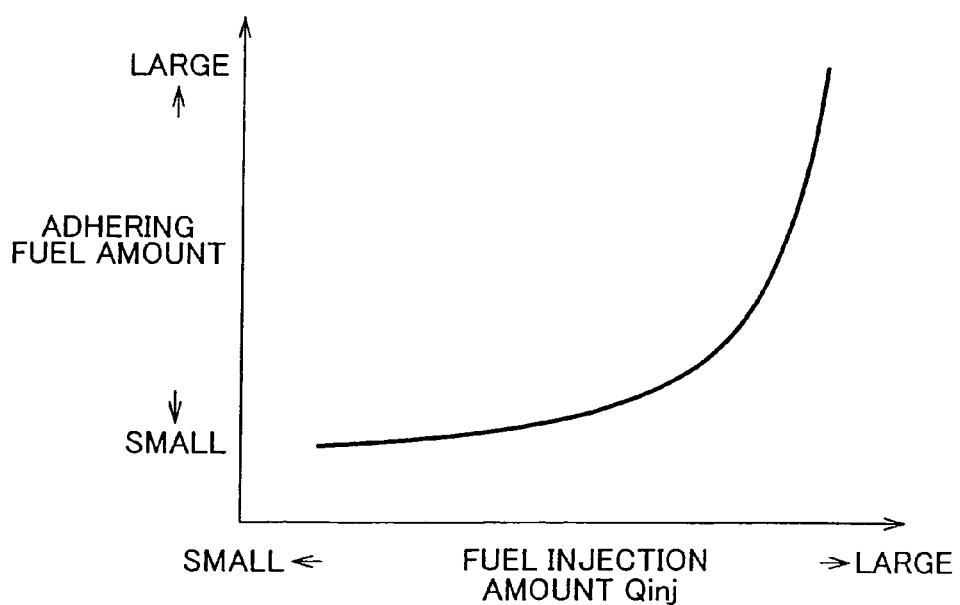
FIG. 7 is a chart illustrating the relation between the fuel injection amount and the adhering fuel amount in the internal combustion engine according to the invention.
Figure 8:
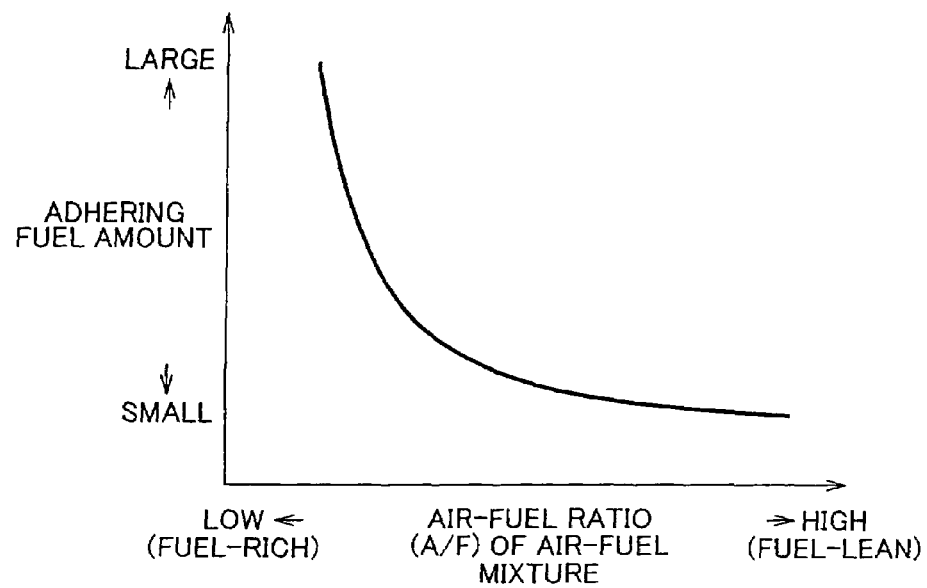
FIG. 8 is a chart illustrating the relation between the air-fuel ratio of air-fuel mixture combusted in each cylinder and the adhering fuel amount in the internal combustion engine according to the invention.

After the internal combustion engine 1 is started, the temperature of the inner face of each cylinder 2 increases as the engine operation continues. The amount of this temperature increase is correlative with the cumulative fuel injection amount ΣQinj representing the cumulative amount of fuel that has been combusted in the cylinder 2, in other words, the cumulative intake air amount ΣGa representing the cumulative amount of air that has been used for combustion in the cylinder 2. Thus, the ECU 20 can estimate the adhering fuel amount also by applying the cumulative intake air amount ΣGa $$\left(\text{or the cumulative fuel injection amount} \sum_{1} Qinj\right),$$

which has been accumulated since the engine start time to the present time, to the map shown in FIG. 5.

Further, the adhering fuel amount decreases as the in-cylinder pressure decreases (in other words, as the negative pressure in the cylinder 2 increases). The in-cylinder pressure is correlative with the intake pressure pm on the downstream side of the throttle valve 6 (e.g., the intake pressure pm detected on an intake stroke). Thus, the ECU 20 can estimate the adhering fuel amount also by applying the intake pressure pm to the map shown in FIG. 6.

Further, the adhering fuel amount tends to increase as the amount of fuel injected from the fuel injection valve 5 (fuel injection amount Qinj) increases. As such, the ECU 20 can estimate the adhering fuel amount also by applying the fuel injection amount Qinj, which represents the amount of fuel injected from each fuel injection valve 5, to the map shown in FIG. 7.

Further, the adhering fuel amount tends to increase as the air-fuel ratio A/F of air-fuel mixture decreases. Therefore, the ECU 20 can estimate the adhering fuel amount also by applying the air-fuel ratio A/F of air-fuel mixture to the map shown in FIG. 8.

Meanwhile, the ECU 20 may use two or more of the maps of FIG. 4 to FIG. 8 in various possible combinations in order to improve the accuracy in estimating the adhering fuel amount. Alternatively, because the air-fuel ratio A/F is correlative with the fuel injection amount Qinj, an adhering fuel amount Dpfuel may be calculated from the coolant temperature thw at the engine start time, the intake pressure pm, the cumulative intake air amount ΣGa, and the fuel injection amount Qinj.

After obtaining the adhering fuel amount using any of the above-described methods, the ECU 20 then determines whether the adhering fuel amount is equal to or larger than a predetermined amount. The predetermined amount may be set to a value that ensures that the total amount of unburned fuel discharged from all the cylinders 2 of the internal combustion engine 1 becomes smaller than a given limit value.

When the ECU 20 determines that the adhering fuel amount is equal to or larger than the predetermined amount, the ECU 20 over-advances the ignition time of each ignition plug 14 beyond the MBT (will be referred to as "ignition time over-advancement"). At this time, the amount by which the ignition time of each ignition plug 14 is advanced (e.g., the amount that the ignition time of each ignition plug 14 is advanced from the MBT) may be set such that the combustion of air-fuel mixture in each cylinder 2 ends at a time point near the compression stroke top dead center.

As a result of the experiments and studies conducted in connection with this invention, it has been revealed that the more the ignition time is advanced from the MBT, the amount of unburned fuel discharged from each cylinder 2 decreases. However, if the ignition time is excessively advanced beyond the MBT, the following undesired effects result.

(1) If the ignition time is excessively advanced beyond the MBT, the combustion of air-fuel mixture starts before the heating and pressurizing effects of the upward movement of the piston 15 are exerted adequately, and therefore the combustion becomes sluggish, resulting in an increase in the heat loss.

(2) If the ignition time is excessively advanced beyond the MBT, the thermal energy produced by the combustion of air-fuel mixture interferes with the upward movement of the piston 15, and therefore the output torque of the internal combustion engine 1 decreases significantly, thus deteriorating the driveability and reducing the fuel economy.

(3) If the ignition time is excessively advanced beyond the MBT, the amount of fuel that enters the clearance between the piston 15, the piston ring, and the inner face of the cylinder bore (crevice volume) increases. The fuel that has entered the crevice volume tends to be discharged from the cylinder 2 without being combusted. As such, if the ignition time is excessively advanced beyond the MBT, it may cause, as an opposite effect, an increase in the amount of unburned fuel discharged from each cylinder 2.

On the other hand, if the amount that the ignition time is advanced is set such that the combustion of air-fuel mixture ends at a time point near the compression stroke top dead center, the peak of the in-cylinder pressure and the peak of the in-cylinder temperature can be made as high as possible within the range where the foregoing undesired effects are suppressed adequately. Therefore, the amount of unburned fuel discharged from each cylinder 2 can be minimized.

Meanwhile, in order to synchronize the time of the end of combustion with a given time point near the compression stroke top dead center, the duration of air-fuel mixture combustion, in other words, the combustion speed of air-fuel mixture needs to be ascertained. The combustion speed of air-fuel mixture is influenced by the in-cylinder temperature, the amount of gas drawn into the cylinder 2 (will be referred to as "in-cylinder gas amount"), the air-fuel ratio A/F of the air-fuel mixture, and so on. Further, even when the combustion speed remains unchanged, the time (crank angle) at which the combustion of air-fuel mixture ends becomes later as the engine speed Ne increases and becomes earlier as the engine speed Ne decreases.

As such, the ECU 20 may be adapted to set the ignition time advancing amount based on the in-cylinder temperature, the in-cylinder gas amount, the air-fuel ratio A/F, and the engine speed Ne. Meanwhile, immediately after the start of the internal combustion engine 1 (that is, during the warming-up of the internal combustion engine 1), the fuel injection amount is controlled such that the air-fuel ratio A/F becomes a value suitable for the coolant temperature thw, and therefore, at this time, the air-fuel ratio A/F can be said to be correlative with the coolant temperature thw. Further, the in-cylinder temperature is also correlative with the coolant temperature thw.

In view of this, the ECU 20 may be adapted to set the ignition time advancing amount based on the in-cylinder temperature, the in-cylinder gas amount, and the engine speed Ne. For example, the ECU 20 may set the ignition time advancing amount using a particular map(s) such as those of FIG. 9 to FIG. 11.

Figure 9:
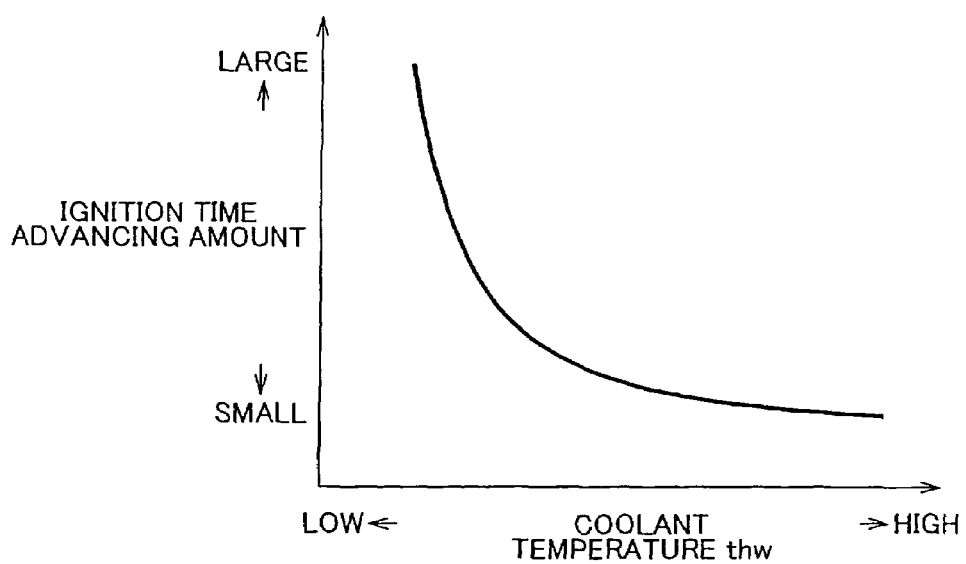
FIG. 9 is a chart illustrating the relation between the coolant temperature and the ignition time advancing amount in the internal combustion engine according to the invention.

The map of FIG. 9 illustrates the relation between the ignition time advancing amount and the coolant temperature thw. According to the map of FIG. 9, the ignition time advancing amount is increased as the coolant temperature thw decreases, and the ignition time advancing amount is reduced as the coolant temperature thw increases.

Figure 10:
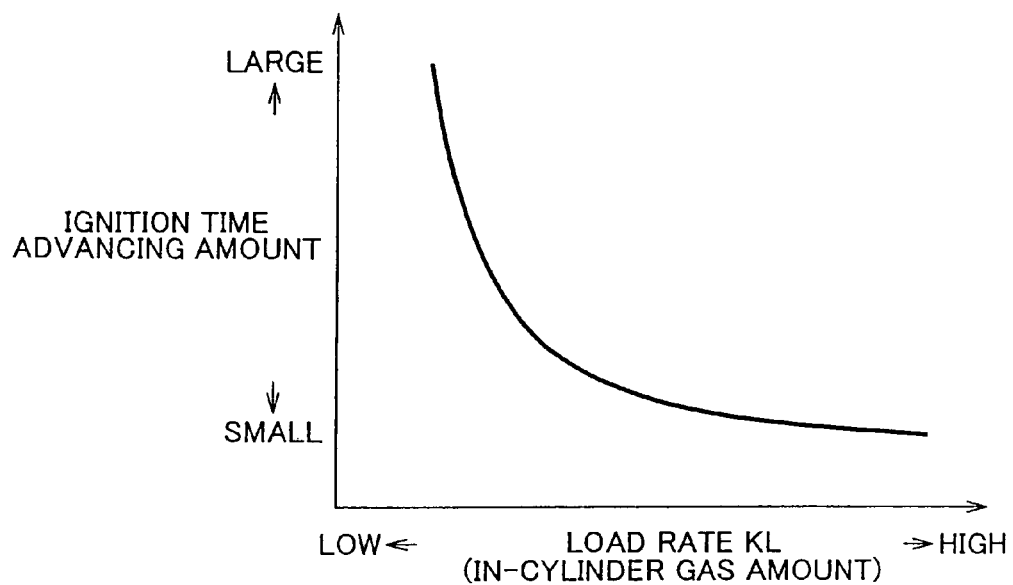
FIG. 10 is a chart illustrating the relation between the engine load rate and the ignition time advancing amount in the internal combustion engine according to the invention.

The map of FIG. 10 illustrates the relation between the ignition time advancing amount and the in-cylinder gas amount. In the map of FIG. 10, a load rate KL of the internal combustion engine 1 is used as an alternative to the in-cylinder gas amount. According to the map of FIG. 10, the ignition time advancing amount is increased as the load rate KL decreases (that is, as the in-cylinder gas amount decreases), and the ignition time advancing amount is reduced as the load rate KL increases (that is, as the in-cylinder gas amount increases).

Figure 11:
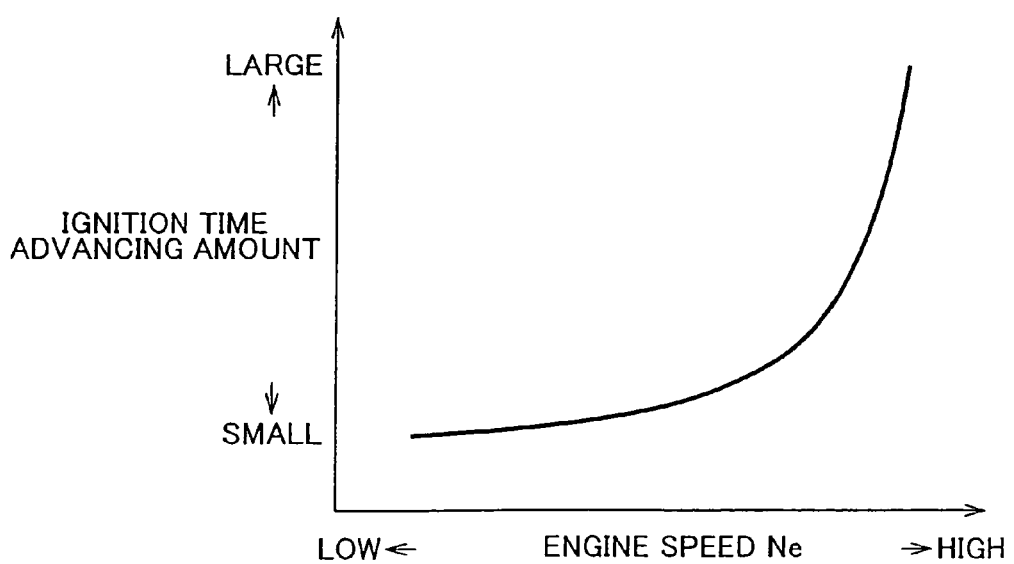
FIG. 11 is a chart illustrating the relation between the engine speed and the ignition time advancing amount in the internal combustion engine according to the invention.

The map of FIG. 11 illustrates the relation between the ignition time advancing amount and the engine speed Ne. According to the map of FIG. 11, the ignition time advancing amount is reduced as the engine speed Ne decreases, and the ignition time advancing amount is increased as the engine speed Ne increases.

In the case where the ignition time advancing amount is determined using a map such as those of FIG. 9 to FIG. 11, the end of air-fuel mixture combustion is set to near the compression stroke top dead center regardless of the operation state of the internal combustion engine 1. As such, the amount of unburned fuel discharged from each cylinder 2 can be minimized while minimizing an increase in the heat loss, reduction of the engine torque, deterioration of the fuel economy, and the like.

Figure 12:
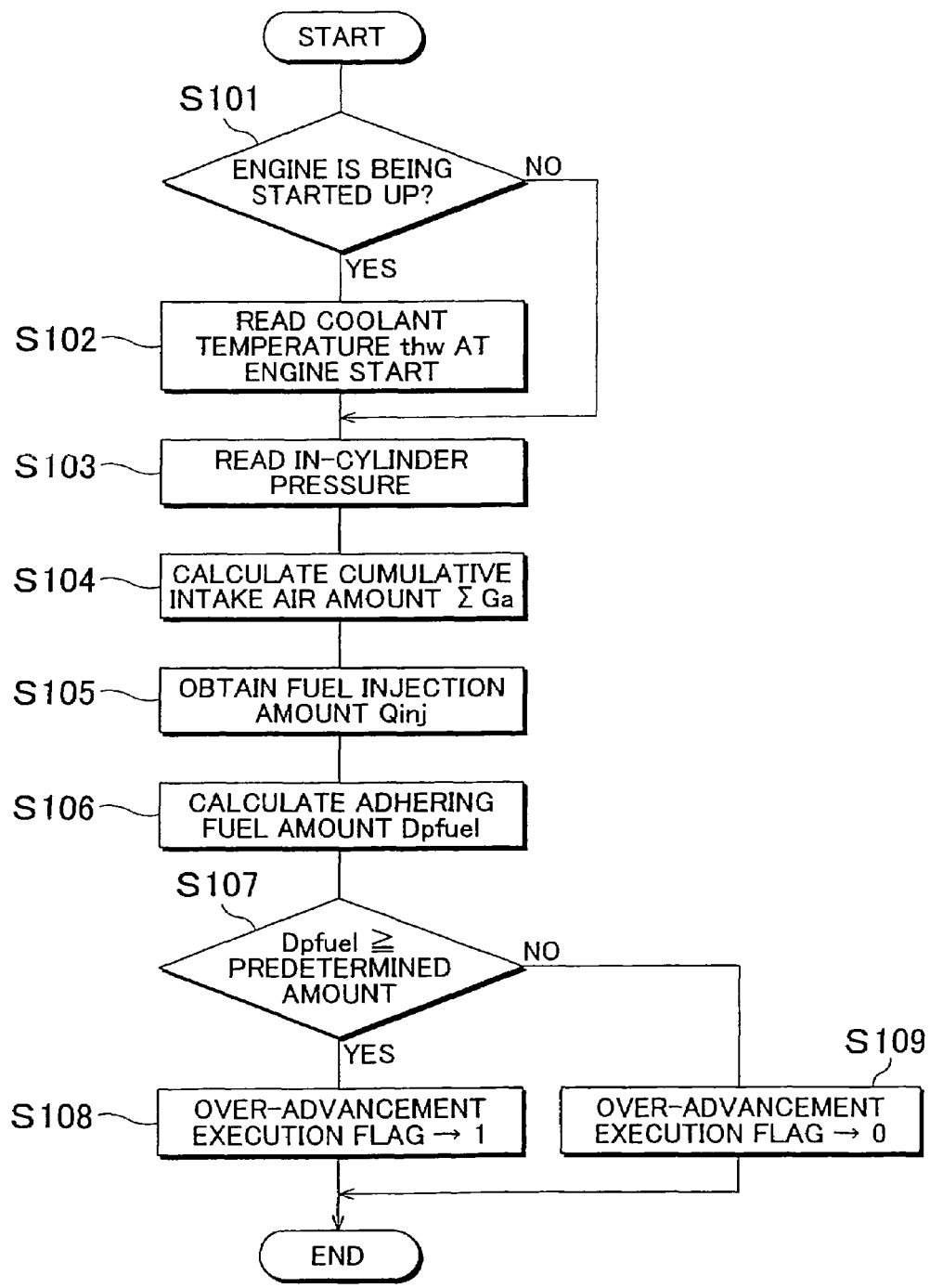
FIG. 12 is a flowchart illustrating an over-advancement execution determination routine according to the first example embodiment of the invention.

Next, the procedure of the adhering fuel reduction control of to the first example embodiment will be described with reference to FIG. 12 and FIG. 13. FIG. 12 is a flowchart illustrating an over-advancement execution determination routine that is a routine for determining whether the ignition time over-advancement needs to be executed, and FIG. 13 is a flowchart illustrating an advancing amount setting routine for determining the amount by which to advance the ignition time for the ignition time over-advancement.

Figure 13:
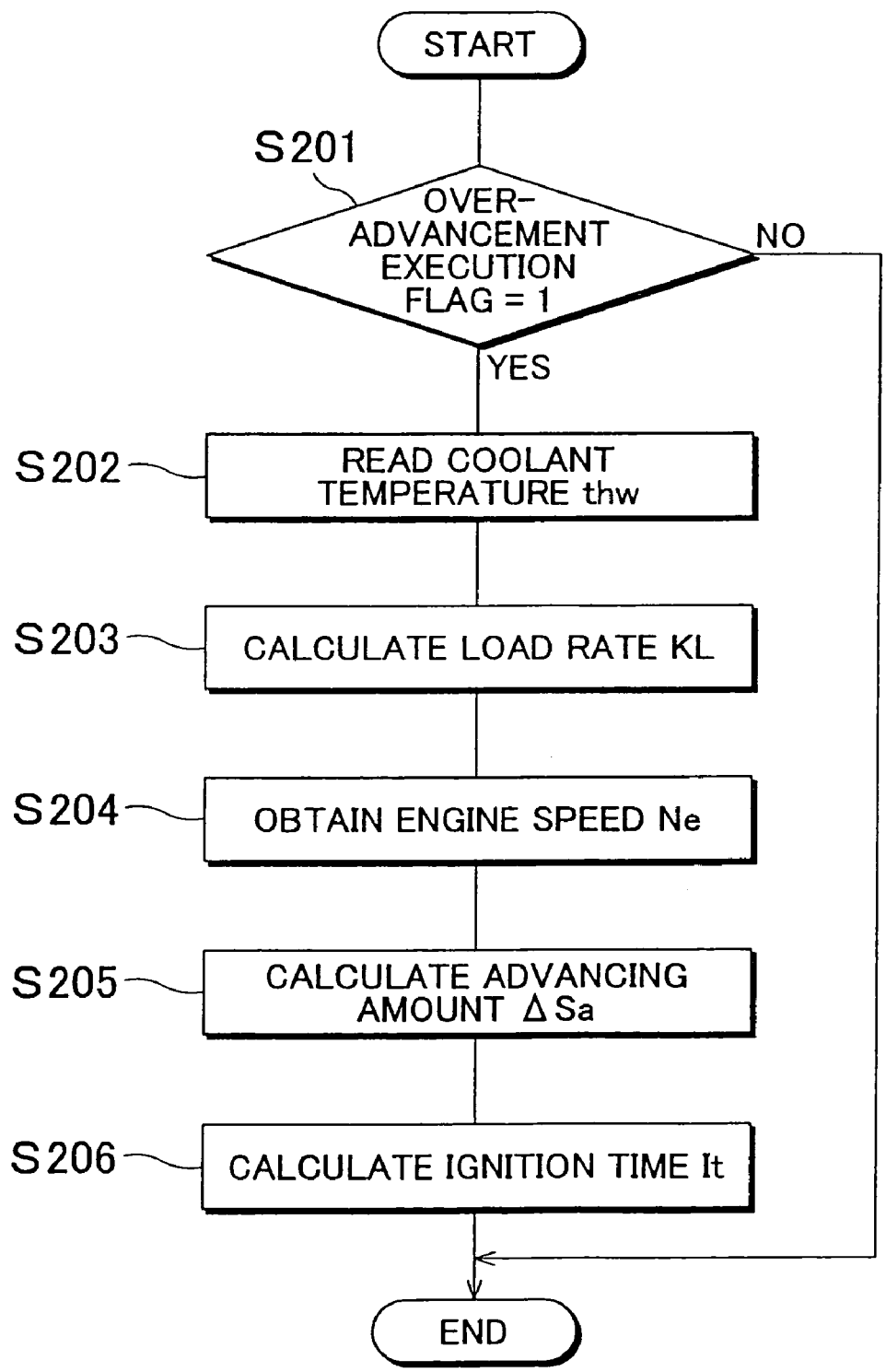
FIG. 13 is a flowchart illustrating an ignition time advancing amount setting routine according to the first example embodiment of the invention.

The routines of FIG. 12 and FIG. 13 are stored in the ROM of the ECU 20 and periodically executed by the ECU 20. Note that, by executing the routines of FIG. 12 and FIG. 13, the ECU 20 serves as "obtaining means", "over-advancing means", and "controlling means" of the invention.

First, in the over-advancement execution determination routine of FIG. 12, the ECU 20 determines whether the internal combustion engine 1 is now being started in step 101. In this step, for example, the ECU 20 determines whether an ignition switch or a starter switch (not shown in the drawings) has been turned on.

If "YES" is obtained in step 101, the ECU 20 proceeds to step 102. In step 102, the ECU 20 reads the value detected by the coolant temperature sensor 19 and then records it in the RAM as the value of the coolant temperature thw at the engine start time. If "NO" is obtained in step 101, on the other hand, the ECU 20 skips step 102 and proceeds to step 103.

In step 103, the ECU 20 reads the value detected by the intake pressure sensor 7 and then records it in the RAM as the in-cylinder pressure.

In step 104, the ECU 20 calculates the cumulative intake air amount ΣGa representing the cumulative amount of intake air that has been drawn into the internal combustion engine 1 since the start of the internal combustion engine 1 to the present time, and the ECU 20 records the calculated cumulative intake air amount ΣGa in the RAM. Note that, in step 104, the cumulative fuel injection amount ΣQinj representing the cumulative amount of fuel that has been injected in the internal combustion engine 1 since the start of the internal combustion engine 1 to the present time may be used as an alternative to the cumulative intake air amount ΣGa.

In step 105, the ECU 20 reads the fuel injection amount Qinj. The fuel injection amount Qinj may either be the amount of fuel to be injected into each cylinder 2 or the amount of fuel that has been injected into each cylinder 2 but has not yet been ignited.

In step 106, the ECU 20 calculates the adhering fuel amount Dpfuel by applying the values obtained in step 102 to step 105 to the maps of FIG. 4 to FIG. 7, respectively.

In step 107, the ECU 20 determines whether the adhering fuel amount Dpfuel calculated in step 106 is equal to or larger than a predetermined amount.

If "YES" is obtained in step 107, the ECU 20 then proceeds to step 108 and sets an over-advancement execution flag to "1". The over-advancement execution flag is formed as a memory region in the RAM, or the like.

On the other hand, if "NO" is obtained in step 107, the ECU 20 proceeds to step 109 and resets the over-advancement execution flag to "0".

Meanwhile, in the advancing amount setting routine in FIG. 13, the ECU 20 first determines whether the over-advancement execution flag is presently set to "1" in step 201. If "NO" is obtained in step 201, the ECU 20 finishes the present cycle of the routine. If "YES" is obtained in step 201, on the other hand, the ECU 20 proceeds to step 202.

In step 202, the ECU 20 reads the value detected by the coolant temperature 19 (the coolant temperature thw). In step 203, the ECU 20 calculates the load rate KL of the internal combustion engine 1. In step 204, the ECU 20 obtains the engine speed Ne.

In step 205, the ECU 20 calculates an advancing amount ΔSa by applying the values obtained in step 202 to step 204 to the maps of FIG. 9 to FIG. 11, respectively. As such, the advancing amount ΔSa is made an amount that brings the end of air-fuel mixture combustion to near the compression stroke top dead center.

In step 206, the ECU 20 sets an ignition time It for each cylinder 2 based on the advancing amount ΔSa obtained in step 205.

With the ignition time It set as described above, the air-fuel mixture combustion ends near the compression stroke top dead center, whereby the peak value of the in-cylinder pressure and the peak value of the in-cylinder temperature are made as large as possible within the range where the foregoing undesired effects are suppressed to or below the allowable levels. As a result, the amount of unburned fuel discharged from each cylinder 2 is effectively reduced, and thus the amount of unburned fuel discharged to the atmosphere decreases.

In the first example embodiment, as described above, the ignition time It for the ignition time over-advancement is set in consideration of the combustion speed of air-fuel mixture and the engine speed Ne. Alternatively, the ignition time It may be set in a simple manner as described below.

Figure 14:
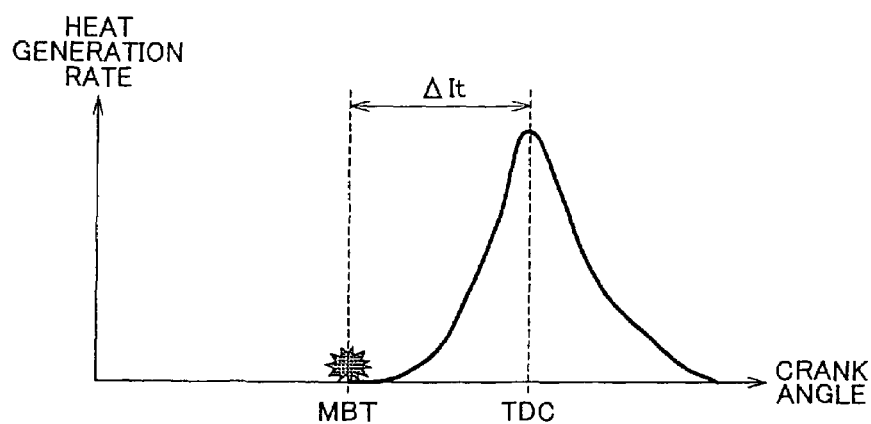
FIG. 14 is a chart illustrating the relation between the heat generation rate and the crank angle when the ignition time is set to the MBT in the internal combustion engine according to the invention.

Referring to FIG. 14, the MBT is set such that the heat generation rate of the combustion of air-fuel mixture peaks near the compression stroke top dead center. At this time, the waveform of the heat generation rate is symmetric about the peak point.

Figure 15:
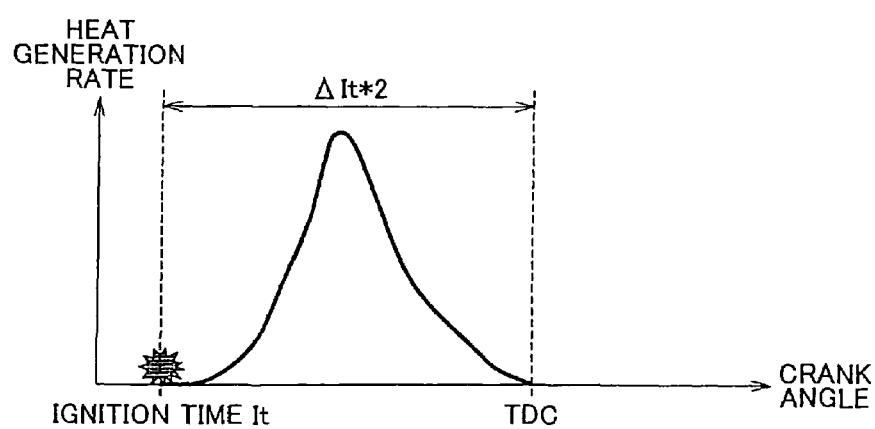
FIG. 15 is a chart illustrating the relation between the heat generation rate and the crank angle in the internal combustion engine according to the invention when the ignition time is advanced to a time point two times earlier than the compression top dead center than the MBT is.

Thus, the ECU 20 may be adapted to obtain a crank angle difference ("ΔIt" in FIG. 14) between the compression stroke top dead center (TDC) and the MBT and set the ignition time It to a point that is twice the crank angle difference ΔIt (ΔIt×2) before the compression stroke top dead center (TDC) (TDC−ΔIt×2) as indicated in FIG. 15. In this method, the end of air-fuel mixture combustion can be set to near the compression stroke top dead center while minimizing the calculation load of the ECU 20.

Further, execution of the ignition time over-advancement may be prohibited when the load of the internal combustion engine 1 is greater than a predetermined level (for example, when the internal combustion engine 1 is running for acceleration). That is, if the ignition time over-advancement is executed when the load of the internal combustion engine 1 is greater than the predetermined level, the internal combustion engine 1 may fail to produce torque as required by the driver and thus may make the driver feel uncomfortable.

Second Example Embodiment

Figure 16:
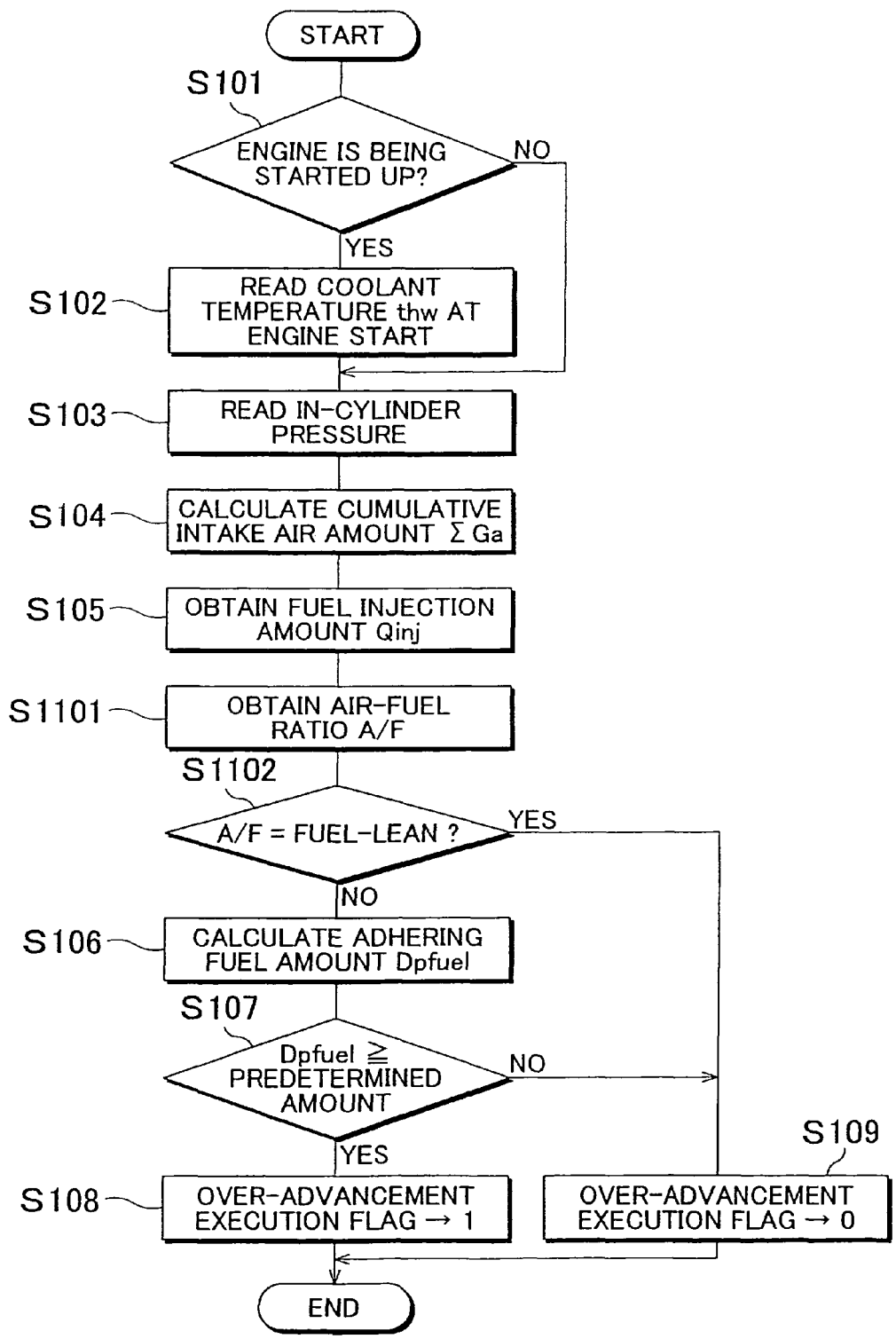
FIG. 16 is a flowchart illustrating an over-advancement execution determination routine according to the second example embodiment of the invention.
Figure 17:
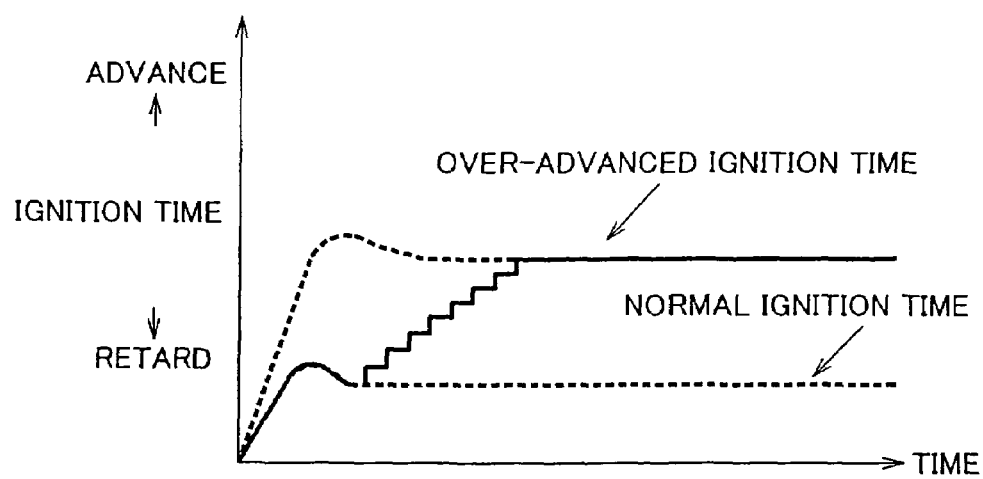
FIG. 17 is a chart illustrating a procedure of changing the ignition time when starting the ignition time over-advancement in the internal combustion engine according to the invention.

Next, an ignition control system according to the second example embodiment of the invention will be described with reference to FIG. 16. In the following description, only the differences from the foregoing first example embodiment will be described, that is, the structures of the ignition control system of the second example embodiment that are the same as those of the ignition control system of the first example embodiment will not be described again.

The second example embodiment is an embodiment of an ignition control system that prohibits execution of the ignition time over-advancement when the air-fuel ratio A/F of air-fuel mixture combusted in each cylinder 2 is fuel-lean.

When the air-fuel ratio of air-fuel mixture combusted in each cylinder 2 is fuel-lean, the amount of unburned fuel discharged from each cylinder 2 is small, and the unburned fuel in the exhaust gas reacts with oxygen at the exhaust gas purification device 9, whereby the exhaust gas purification device 9 quickly heats up to its activation temperature range. Further, when the ignition time over-advancement of is executed, combustion starts earlier than normal, and therefore the exhaust gas temperature tends to be low.

As such, by prohibiting execution of the ignition time over-advancement when the air-fuel ratio A/F of air-fuel mixture is fuel-lean, the reduction of the exhaust gas temperature can be suppressed, whereby the reactions between the unburned fuel and oxygen at the exhaust gas purification device 9 are promoted. As a result, the exhaust gas purification device 9 can be activated quickly.

Hereafter, the procedure of the adhering fuel reduction control of the second example embodiment will be described with reference to FIG. 16. FIG. 16 is a flowchart illustrating the adhering fuel reduction control of the second example embodiment. In the flowchart of FIG. 16, the steps that are the same as those of the over-advancement execution determination routine of the first example embodiment (Refer to FIG. 12) are denoted by the same numerals.

In this routine, after executing step 105, the ECU 20 proceeds to step 1101 and obtains the air-fuel ratio A/F. The air-fuel ratio A/F may either be calculated from the value detected by the airflow meter 8 and the fuel injection amount Qinj or detected using an air-fuel ratio sensor (not shown in the drawings) that is provided in the exhaust passage 40.

Then, the ECU 20 proceeds to step 1102 and determines whether the air-fuel ratio A/F obtained in step 1101 is fuel-lean. If "NO" is obtained in step 1102, the ECU 20 executes step 106 and its subsequent steps. If "YES" is obtained in step 1102, on the other hand, the ECU 20 proceeds to step 109 and sets the over-advancement execution flag to "0", whereby execution of the ignition time over-advancement is prohibited.

In the second example embodiment described above, the exhaust gas purification device 9 can be activated quickly, and therefore the exhaust emissions can be further reduced by the purification capability of the exhaust gas purification device 9.

Third Example Embodiment

Next, an ignition control system according to the third example embodiment of the invention will be described. In the following description, only the differences from the foregoing first example embodiment will be described, that is, the structures of the ignition control system of the third example embodiment that are the same as those of the ignition control system of the first example embodiment will not be described again.

The third example embodiment is an embodiment of an ignition control system that optimizes the fuel injection time during execution of the ignition time over-advancement.

When the internal combustion engine 1 is being started or being warmed up, the fuel injection time is, at times, set to a time point that is non-synchronous with the intake stroke of the cylinder 2 (This fuel injection mode will be referred to as "intake-non-synchronous injection mode"). During the intake-non-synchronous injection mode, much fuel tends to adhere to the inner face of each intake port 3 as well as to the inner face of each cylinder 2. The fuel that has adhered to the inner face of each intake port 3 may be discharged to the exhaust passage 40 as unburned fuel during the valve-overlap period between the intake valves 10 and the exhaust valves 11.

Meanwhile, in the case where the fuel injection time is set to a time point that is synchronous with the intake stroke of the cylinder 2 (This fuel injection mode will be referred to as "intake-synchronous injection mode"), the amount of fuel that adheres to the inner face of each intake port 3 decreases. As the amount of fuel that adheres to the inner face of the intake port 3 decreases, the amount of fuel that adheres to the inner face of each cylinder 2 may increases in turn. However, the fuel adhering on the inner face of each cylinder 2 can be reduced through the ignition time over-advancement.

As such, by switching the fuel injection mode from the intake-non-synchronous injection mode to the intake-synchronous injection mode when the ignition time over-advancement is executed, it is possible to reduce the amount of fuel that adheres to the inner face of each intake port 3 as well as the amount of fuel that adheres to the inner face of each cylinder 2. As such, the amount of unburned fuel discharged from the cylinders 2 of the internal combustion engine 1 can be further reduced.

In the above case, the time to switch the fuel injection mode from the intake-non-synchronous injection mode to the intake-synchronous injection mode may either be when starting the ignition time over-advancement or a predetermined time (e.g., one to two cycles) after the start of the ignition time over-advancement.

Switching the fuel injection mode from the intake-non-synchronous injection mode to the intake-synchronous injection mode a predetermined time after the start of the ignition time over-advancement, rather than when starting it, provides the following advantage. That is, during the intake-synchronous injection mode, the amount of fuel that adheres to the inner face of each cylinder 2 tends to increase even though the amount of fuel that adheres to the inner face of each intake port 3 decreases. The in-cylinder temperature (the temperature of the inner face of each cylinder 2 and the temperature of the atmosphere in each cylinder 2) is low immediately after the start of the ignition time over-advancement. At this time, if more fuel adheres to the inner face of each cylinder 2 as a result of execution of the intake-synchronous injection mode, it makes it difficult to vaporize and combust the adhering fuel entirely.

An option for coping with this issue is to switch the fuel injection mode from the intake-non-synchronous injection mode to the intake-synchronous injection a predetermined time after the start of the ignition time over-advancement, not at the time of starting it. In this case, because the in-cylinder temperature is already high when the fuel injection mode is switched from the intake-non-synchronous injection mode to the intake-synchronous injection mode, even if the fuel on the inner faces of the intake ports 3 enters the respective cylinders 2, the fuel can be vaporized and combusted almost entirely.

Fourth Example Embodiment

Next, an ignition control system according to the fourth example embodiment of the invention will be described with reference to FIG. 17 to FIG. 20. In the following description, only the differences from the foregoing first example embodiment will be described, that is, the structures of the ignition control system of the fourth example embodiment that are the same as those of the ignition control system of the first example embodiment will not be described again.

The fourth example embodiment is an embodiment of an ignition control system that gradually changes the ignition time when starting the ignition time over-advancement and when finishing it.

If the ignition time is rapidly changed (i.e., advanced) when starting the ignition time over-advancement, it may cause a noticeable change in the combustion state and/or a noticeable change in the engine torque. Therefore, in the fourth example embodiment, the ECU 20 is adapted to gradually change the ignition time when starting and finishing the ignition time over-advancement.

For example, when starting the ignition time over-advancement, the ECU 20 advances the ignition time from the normal ignition time (Refer to "NORMAL IGNITION TIME" in FIG. 17) to the over-advanced ignition time (Refer to "OVER-ADVANCED IGNITION TIME" in FIG. 17) gradually over multiple cycles.

The amount that the ignition time is advanced in one cycle may either be a fixed amount or a variable amount that varies in accordance with the difference between the normal ignition time and the over-advanced ignition time (e.g., a variable amount that increases as the same difference increases).

Figure 18:
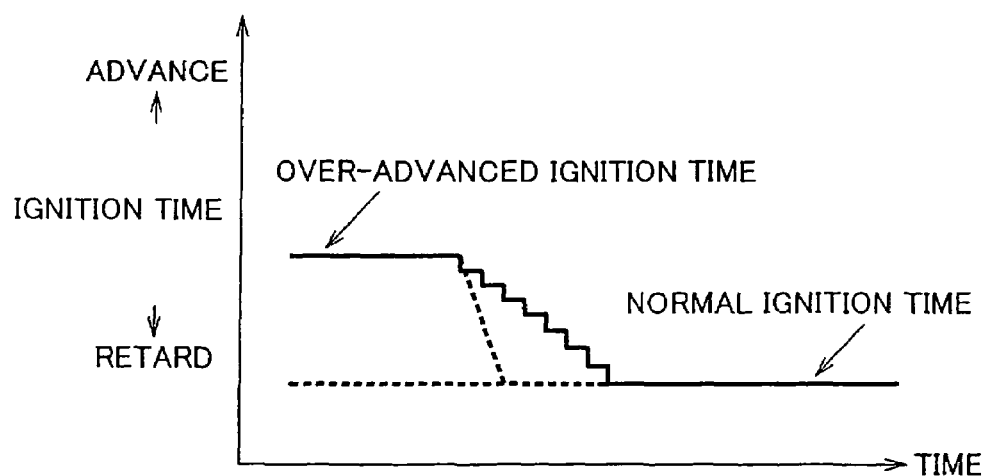
FIG. 18 is a chart illustrating a procedure of changing the ignition time when finishing the ignition time over-advancement in the internal combustion engine according to the invention.

Likewise, when finishing the ignition time over-advancement, the ECU 20 retards the ignition time from the over-advanced ignition time to the normal ignition time gradually over multiple cycles (Refer to FIG. 18).

Thus, by gradually changing the ignition time when starting and/or finishing the ignition time over-advancement as mentioned above, it is possible to prevent noticeable changes in the combustion state and the engine torque.

Figure 19:
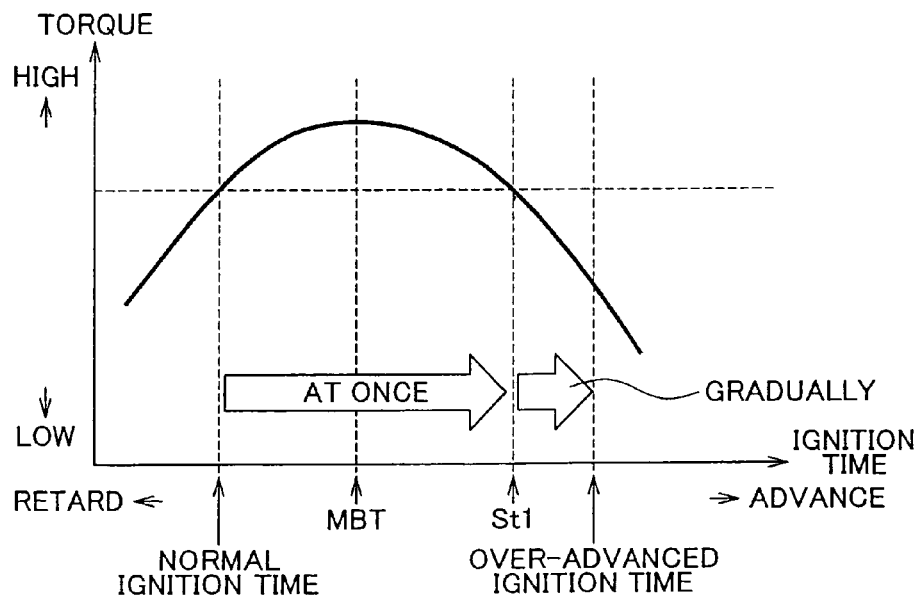
FIG. 19 is a chart illustrating other procedure of changing the ignition time when starting the ignition time over-advancement in the internal combustion engine according to the invention.

Meanwhile, referring to FIG. 19, in the case where an ignition time St1 that makes the engine torque substantially equal to that obtained with the normal ignition time is earlier than the MBT, when starting the ignition time over-advancement, the ECU 20 may advance the ignition time from the normal ignition time to the ignition time St1 at once and then from the ignition time St1 to the over-advanced ignition time gradually over multiple cycles.

According to this method, the ignition time can be switched from the normal ignition time to the over-advanced ignition time in a shorter time. Likewise, when finishing the ignition time over-advancement, the ECU 20 may retard the ignition time from the over-advanced ignition time back to the ignition time St1 gradually over multiple cycles and then from the ignition time St1 to the normal ignition time at once. According to this method, the ignition time can be switched from the over-advanced ignition time back to the normal ignition time in a shorter time.

Further, the ECU 20 may be adapted to advance the ignition time from the normal ignition time to the over-advanced ignition time at once while adjusting the intake air amount so as to avoid a noticeable change in the engine torque.

Figure 20:
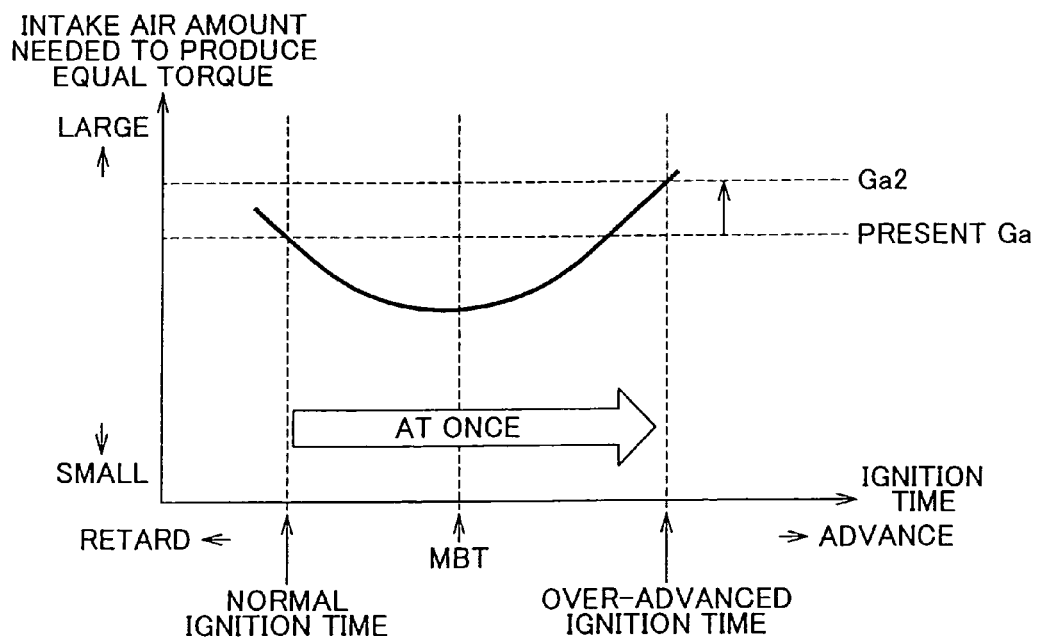
FIG. 20 is a chart illustrating other procedure of changing the ignition time when starting the ignition time over-advancement in the internal combustion engine according to the invention.

For example, referring to FIG. 20, the ECU 20 identifies an intake air amount Ga2 that is the amount of intake air that will be necessary to produce torque that is substantially equal to the present torque (i.e., the torque obtained with the normal ignition time) after the ignition time is advanced to the over-advanced ignition time. Then, the ECU 20 advances the ignition time from the normal ignition time to the over-advanced ignition time at once while controlling the throttle valve 6 so as to achieve the identified intake air amount Ga2.

According to this method, the ignition time can be quickly advanced from the normal ignition time to the over-advanced ignition time while avoiding a noticeable change in the engine torque. Likewise, the ECU 20 may be adapted to identify, when finishing the ignition time over-advancement, the amount of intake air that will be necessary to produce torque that is substantially equal to the present torque (i.e., the torque obtained with the over-advanced ignition time) after the ignition time is retarded from the over-advanced ignition time back to the normal ignition time and then retard the ignition time from the over-advanced ignition time back to the normal ignition time while controlling the throttle valve 6 so as to achieve the identified intake air amount. According to this method, the ignition time can be quickly retarded from the over-advanced ignition time back to the normal ignition time while avoiding a noticeable change in the engine torque.

Fifth Example Embodiment

Next, an ignition control system according to the fifth example embodiment of the invention will be described with reference to FIG. 21 to FIG. 23. In the following description, only the differences from the foregoing first example embodiment will be described, that is, the structures of the ignition control system of the fifth example embodiment that are the same as those of the ignition control system of the first example embodiment will not be described again.

The fifth example embodiment is an embodiment of an ignition control system that limits the over-advanced ignition time such that the in-cylinder pressure peaks at or after the compression stroke top dead center.

During the ignition time over-advancement, an air-fuel mixture is combusted while the piston 15 is moving upward, and therefore the pressure of the combustion of the air-fuel mixture interferes with the upward movement of the piston 15, so that the torque of the internal combustion engine 1 decreases.

In this case, if the in-cylinder pressure peaks before the compression stroke top dead center, there is a possibility that the total sum of the pressure that is exerted to the piston 15 on the power stroke (will hereinafter be referred to as "first total pressure") becomes equal to or smaller than the total sum of the pressure that is exerted to the piston 15 on the compression stroke (will hereinafter be referred to as "second total pressure").

Meanwhile, friction occurs at each movable portion in the internal combustion engine 1, and in order for the internal combustion engine 1 to produce a positive torque, the first total pressure needs to be larger than the total sum of the second total pressure and the frictions in the internal combustion engine 1. However, when the first total pressure becomes equal to or smaller than the second total pressure, in some cases, the internal combustion engine 1 can not overcome the frictions in the internal combustion engine 1 and thus the internal combustion engine 1 can not produce a positive torque.

Figure 21:
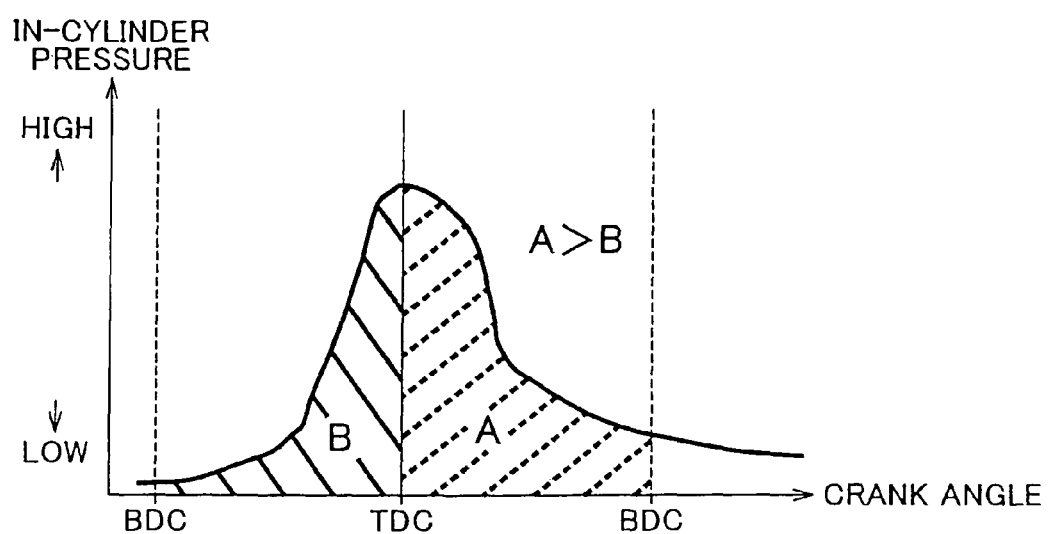
FIG. 21 is a chart illustrating the result of measurement of the in-cylinder pressure when the ignition time is set such that the in-cylinder pressure peaks at a time point near the compression stroke top dead center in the internal combustion engine according to the invention.
Figure 22:
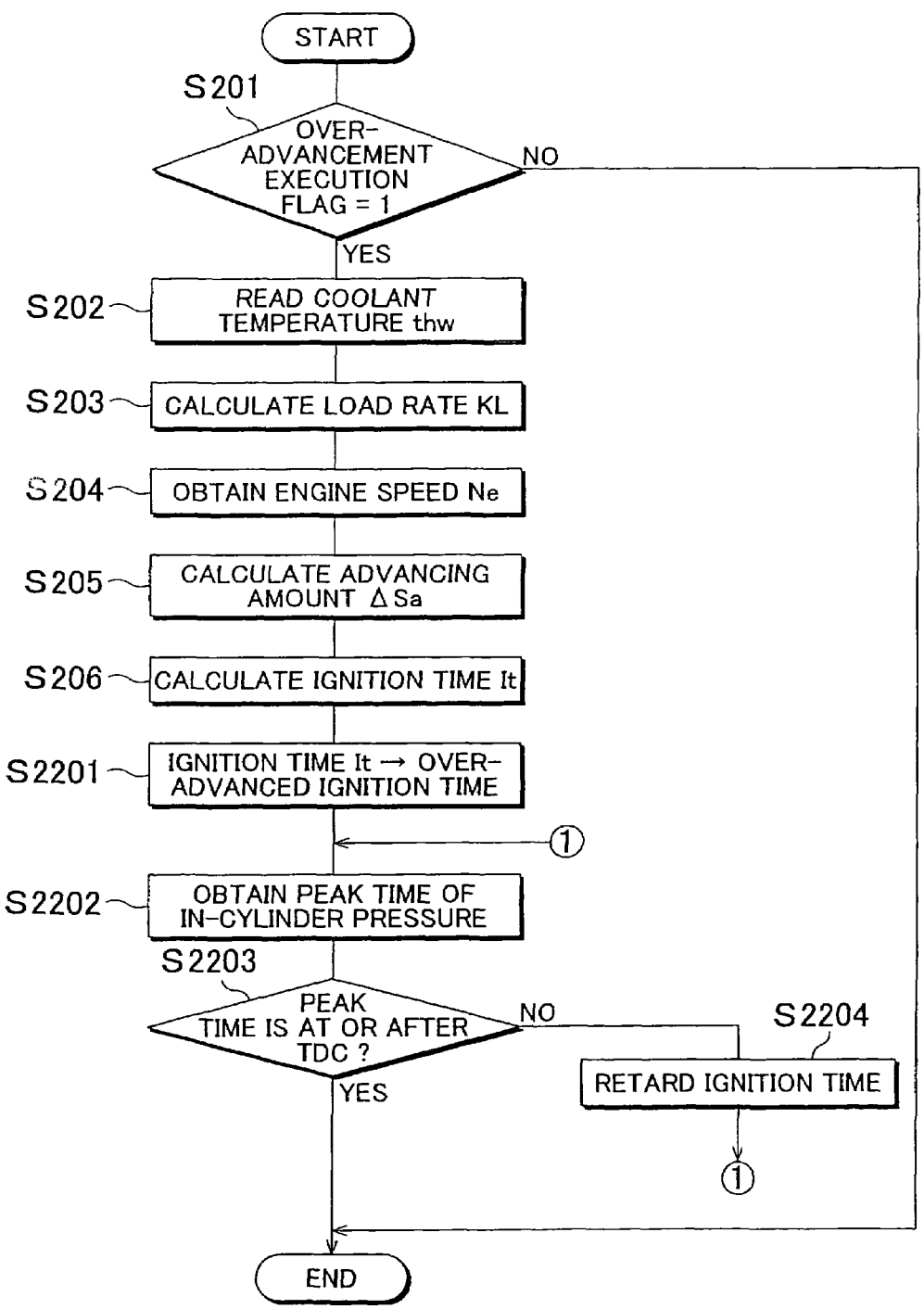
FIG. 22 is a flowchart illustrating an ignition time advancing amount setting routine according to the fifth example embodiment of the invention.

FIG. 21 is a chart illustrating the in-cylinder pressure that was measured when the ignition time was set such that the in-cylinder pressure peaks at the compression stroke top dead center.

In the case illustrated in FIG. 21, the first total pressure (indicated by the region "A" in FIG. 21) is larger than the second total pressure (indicated by the region "B" in FIG. 21) by an amount corresponding to the thermal expansion of the combustion gas, and the difference between the first total pressure and the second total pressure (i.e., the value obtained by subtracting the second total pressure from the first total pressure) is sufficiently larger than the frictions in the internal combustion engine 1.

In view of this, during the adhering fuel reduction control of the fifth example embodiment, the ECU 20 sets the ignition time that makes the in-cylinder pressure peak at the compression stroke top dead center as an advancement limit (will hereinafter be referred to as "torque limit ignition time") and limits the over-advanced ignition time such that it does not become earlier than the torque limit ignition time.

More specifically, the ECU 20 compares the ignition time set in the advancing amount setting routine, which has been described in the first example embodiment with reference to FIG. 13, with the torque limit ignition time. The ignition time set in the advancing amount setting routine will hereinafter be referred to as "standard ignition time".

When the standard ignition time is later than the torque limit ignition time, the ECU 20 executes the ignition time over-advancement by using the standard ignition time as the over-advanced ignition time. On the other hand, when the standard ignition time is earlier than the torque limit ignition time, the ECU 20 executes the ignition time over-advancement by using the torque limit ignition time as the over-advanced ignition time.

Meanwhile, the torque limit ignition time may either be empirically obtained in advance or determined using the in-cylinder pressure sensor.

In the case where the torque limit ignition time is determined using the in-cylinder pressure sensor, the ECU 20 first sets the over-advanced ignition time to the standard ignition time temporarily and identifies, from the value detected by the in-cylinder pressure sensor at this time, the time (crank angle) at which the in-cylinder pressure peaks. Then, if the peak time of the in-cylinder pressure is at or after the compression stroke top dead center, the ECU 20 continues the ignition time over-advancement using the standard ignition time as the over-advanced ignition time. On the other hand, if the peak time of the in-cylinder pressure is before the compression stroke top dead center, the ECU 20 retards the over-advanced ignition time from the standard ignition time.

Hereinafter, the procedure of the adhering fuel reduction control of the fifth example embodiment will be described with reference to FIG. 22. FIG. 22 is a flowchart illustrating the advancing amount setting routine of the fifth example embodiment. In the flowchart of FIG. 22, the steps that are the same as those of the advancing amount setting routine of the first example embodiment (Refer to FIG. 13) are denoted by the same numerals.

In the advancing amount setting routine of the fifth example embodiment, after setting the ignition time (standard ignition time) It in step 206, the ECU 20 proceeds to step 2201 and starts the ignition time over-advancement by using the determined ignition time (standard ignition time) It as the over-advanced ignition time.

Then, in step 2202, the ECU 20 identifies, based on the value detected by the in-cylinder pressure sensor, the time at which the in-cylinder pressure peaks (peak time).

Then, in step 2203, the ECU 20 determines whether the peak time identified in step 2202 is at or after the compression stroke top dead center (TDC). IF "YES" is obtained in step 2203, the ECU 20 then continues the ignition time over-advancement using the ignition time (standard ignition time) It as the over-advanced ignition time.

On the other hand, if "NO" is obtained in step 2203, the ECU 20 then proceeds to step 2204. In step 2204, the ECU 20 corrects the over-advanced ignition time by retarding it. The amount by which the over-advanced ignition time is retarded at this time may either be a constant value that is set in advance or a variable value that varies in accordance with the difference between the peak time of the in-cylinder pressure and the compression stroke top dead center TDC (e.g., a variable value that increases as the same difference increases).

After finishing step 2204, the ECU 20 then executes step 2202 and its subsequent steps again. That is, the ECU 20 repeatedly performs the retarding correction to the over-advanced ignition time until "YES" is obtained in step 2203.

According to the fifth example embodiment, as such, the amount of unburned fuel discharged from the cylinders 2 can be reduced while ensuring that the internal combustion engine 1 produces at least the minimum necessary level of torque.

As described above, in the fifth example embodiment, only the engine torque is taken into consideration when limiting the over-advanced ignition time. The invention is not limited to it. That is, for example, the variation of the combustion state or the variation of the engine torque may be taken into consideration when limiting the over-advanced ignition time as in the example described below.

Figure 23:
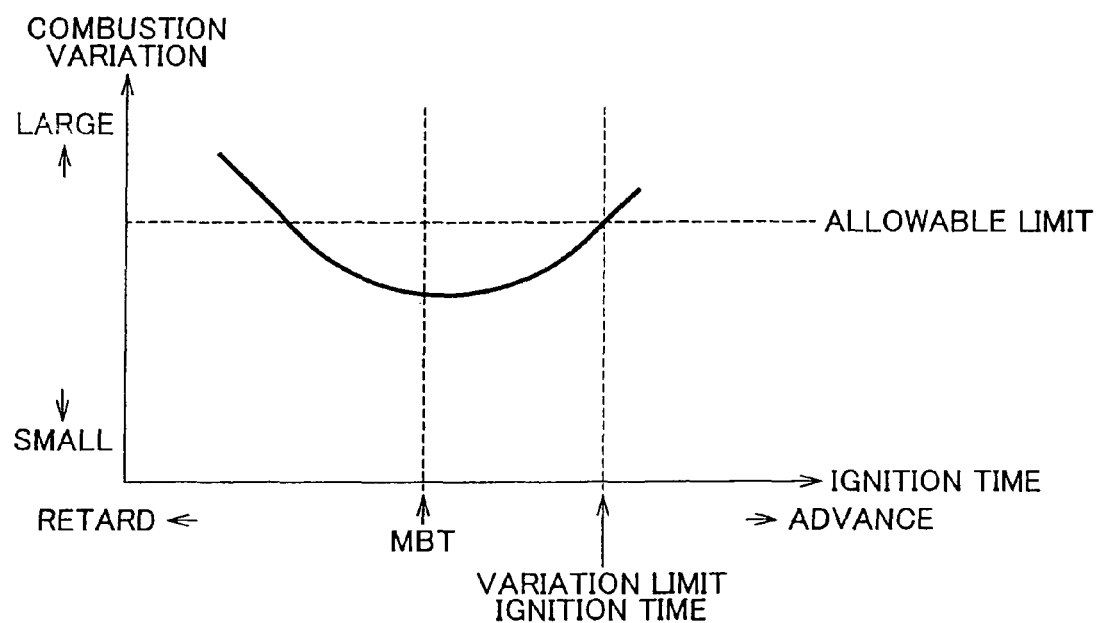
FIG. 23 is a chart illustrating the relation between the combustion state variation and the ignition time in the internal combustion engine of the invention.

In this example, the ECU 20 determines, based on the relation between the magnitude of variation of the combustion state and the ignition time such as illustrated in FIG. 23, the earliest ignition time within the range where the magnitude of variation of the combustion state is equal to or smaller than an allowable limit. This earliest ignition time will hereinafter be referred to as "variation limit ignition time". Then, the ECU 20 compares the standard ignition time, the torque limit ignition time, and the variation limit ignition time, and sets the latest among them as the over-advanced ignition time.

Figure 24:
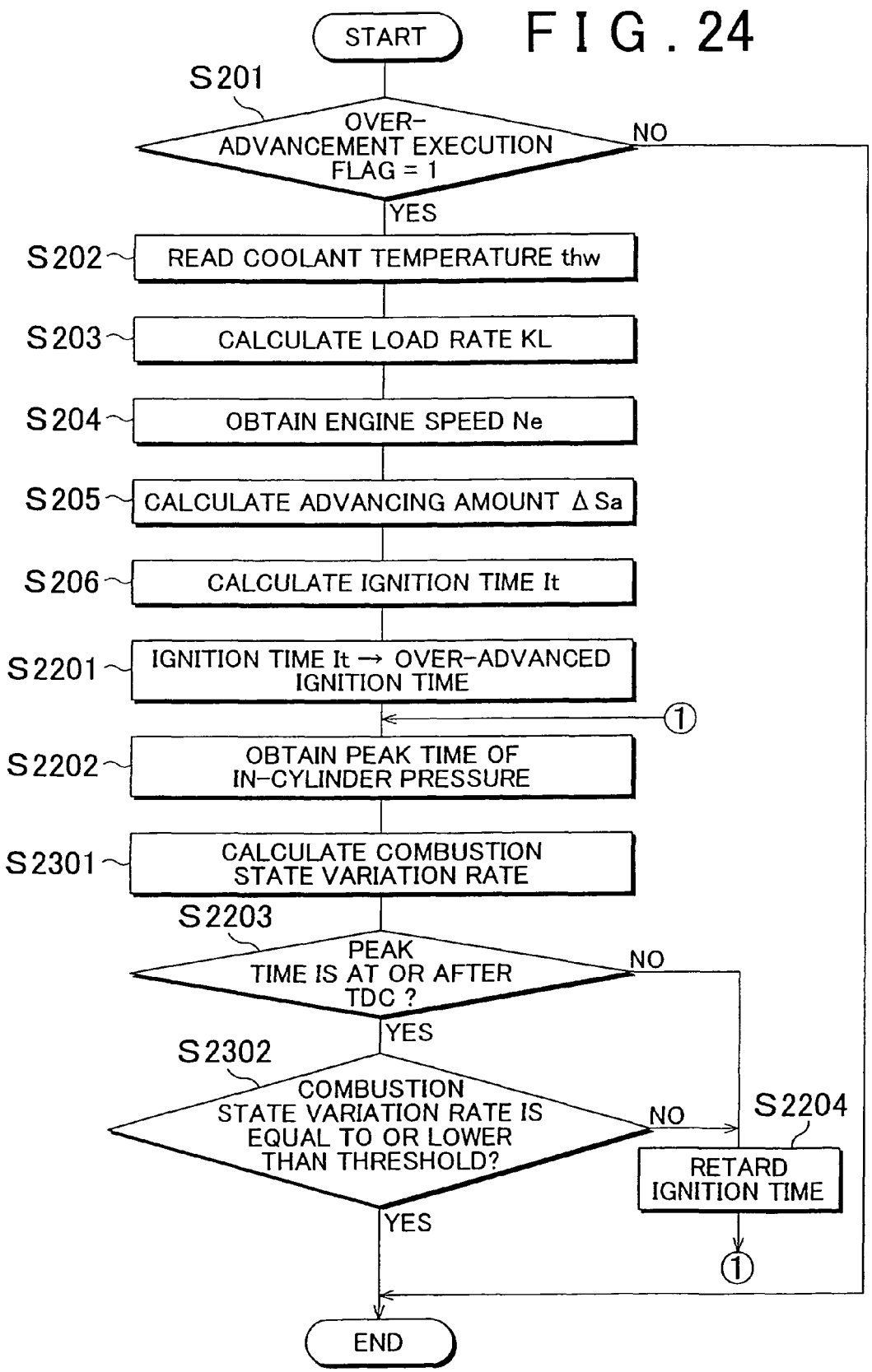
FIG. 24 is a flowchart illustrating another example of the ignition time advancing amount setting routine according to the fifth example embodiment of the invention.

Further, the ECU 20 may be adapted to calculate the rate of variation of the combustion state from the values detected by the in-cylinder sensor and correct the over-advanced ignition time such that the calculated variation rate becomes equal to or lower than a given threshold. In this case, the ECU 20 can determine the over-advanced ignition time by executing a routine such as the one illustrated in FIG. 24. In the flowchart of FIG. 24, the steps that are the same as those of the advancing amount setting routine of FIG. 22 are denoted by the same numerals.

In the advancing amount setting routine of FIG. 24, after obtaining the peak time of the in-cylinder pressure in step 2202, the ECU 20 proceeds to step 2301. In step 2301, the ECU 20 calculates the combustion state variation rate from the values detected by the in-cylinder pressure sensor.

Then, in step 2203, the ECU 20 determines whether the peak time of the in-cylinder pressure obtained in step 2202 is at or after the compression stroke top dead center. If "YES" is obtained in step 2203, the ECU 20 then proceeds to step 2302, and determines whether the combustion state variation rate calculated in step 2301 is equal to or lower than the threshold.

If "YES" is obtained in step 2302, the ECU 20 continues the ignition time over-advancement without correcting the over-advanced ignition time. On the other hand, if "NO" is obtained in step 2203 or in step 2302, the ECU 20 performs the retarding correction to the over-advanced ignition time and then executes steps 2202 and its subsequent steps again.

By setting the over-advanced ignition time in the manner described above, the amount of unburned fuel discharged from the cylinders 2 can be reduced while suppressing the variation of the combustion state and preventing an excessive decrease in the engine torque.

Sixth Example Embodiment

Next, an ignition control system according to the sixth example embodiment of the invention will be described with reference to FIG. 25 to FIG. 28. In the following description, only the differences from the foregoing first example embodiment will be described, that is, the structures of the ignition control system of the sixth example embodiment that are the same as those of the ignition control system of the first example embodiment will not be described again.

The sixth example embodiment is an embodiment of an ignition control system that, when executing the ignition time over-advancement, changes the advancing amount of the ignition time in accordance with the amount of fuel that adheres to the inner face of the cylinder 2 (adhering fuel amount Dpfuel).

During the ignition time over-advancement, the peak of the thermal energy produced by the combustion of air-fuel mixture (in other words, the peak of the heat generation rate) shifts to a certain point before the compression stroke top dead center, and this leads to a decrease in the toque of the internal combustion engine 1 and deterioration of the fuel economy.

Such undesired effects worsen as the advancing amount of the ignition time increases. To counter this, therefore, when the adhering fuel amount Dpfuel is small, the ignition time advancing amount may be reduced to minimize the reduction of the torque of the internal combustion engine 1 and the deterioration of the fuel economy.

Thus, in the adhering fuel reduction control of the sixth example embodiment, the ECU 20 increases the ignition time advancing amount as the adhering fuel amount Dpfuel increases and reduces the ignition time advancing amount as the adhering fuel amount Dpfuel decreases.

Figure 25:
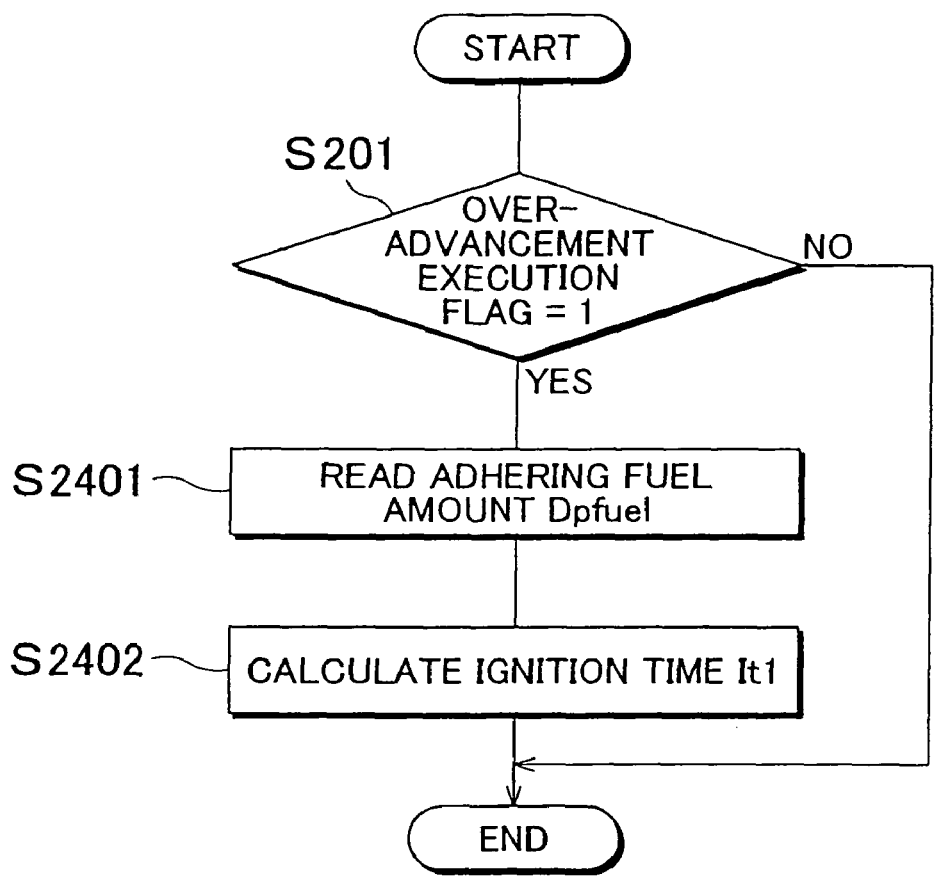
FIG. 25 is a flowchart illustrating an ignition time advancing amount setting routine according to the sixth example embodiment of the invention.

Hereinafter, the procedure of the adhering fuel reduction control of the sixth example embodiment will be described with reference to FIG. 25. FIG. 25 is a flowchart illustrating the advancing amount setting routine of the sixth example embodiment. In the flowchart of FIG. 25, the steps that are the same as those in the advancing amount setting routine of the first example embodiment (Refer to FIG. 13) are denoted by the same numerals.

In the advancing amount setting routine of FIG. 25, the ECU 20 determines whether the over-advancement execution flag is presently set to "1" in step 201. If "YES" is obtained in step 201, the ECU 20 proceeds to step 2401 and reads the adhering fuel amount Dpfuel that has been calculated in the ignition time over-advancement execution determination routine of the first example embodiment (Refer to FIG. 12).

Figure 26:
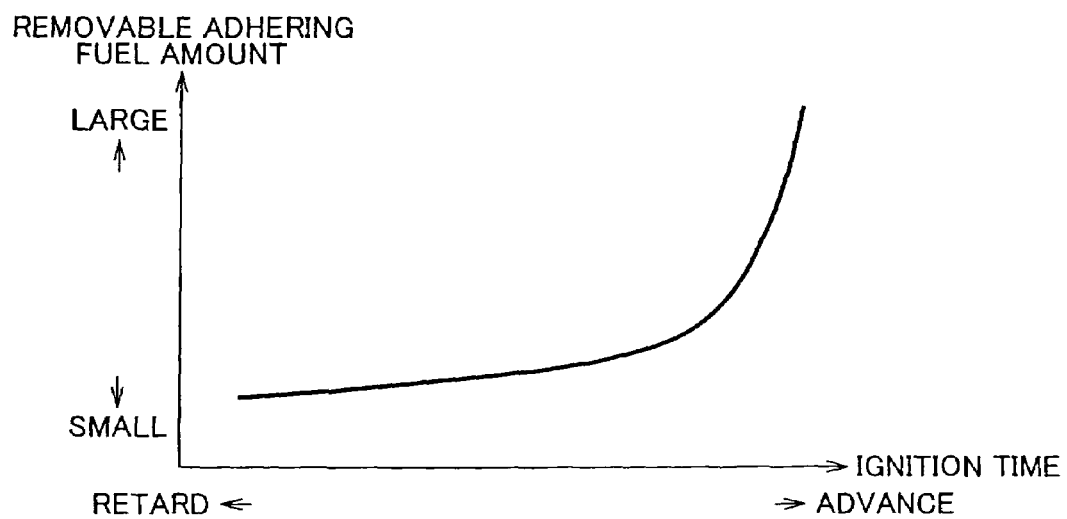
FIG. 26 is a chart illustrating the relation between the ignition time and the amount of removable unburned fuel in the internal combustion engine according to the invention.

Then, in step 2402, the ECU 20 sets an ignition time It1 for the ignition time over-advancement based on the adhering fuel amount Dpfuel. At this time, for example, the ignition time It1 is determined using a map as shown in FIG. 26. The map of FIG. 26 is empirically formulated and defines the amount of adhering fuel that can be removed (vaporized and then combusted) at each ignition time.

Setting the ignition time It1 for the ignition time over-advancement as described above minimizes the ignition time advancing amount, and therefore the amount of unburned fuel discharged from the cylinders 2 can be reduced while minimizing the reduction of the torque of the internal combustion engine 1 and the reduction of the fuel economy.

Meanwhile, the above adhering fuel reduction control of the six example embodiment may be combined with at least one of the adhering fuel reduction controls of the second to fourth example embodiments. For example, when the air-fuel mixture combusted in the cylinder 2 is fuel-lean, execution of the ignition time over-advancement may be prohibited. Further, during the ignition time over-advancement, the fuel injection mode may be set to the intake-synchronous injection mode. Further, when starting and finishing the ignition time over-advancement, the ignition time may be changed gradually.

In the adhering fuel reduction control of the six example embodiment, the over-advanced ignition time may be limited as it is in the fifth example embodiment described above. That is, the over-advanced ignition time may be limited such that it does not become earlier than a predetermined time.

Figure 27:
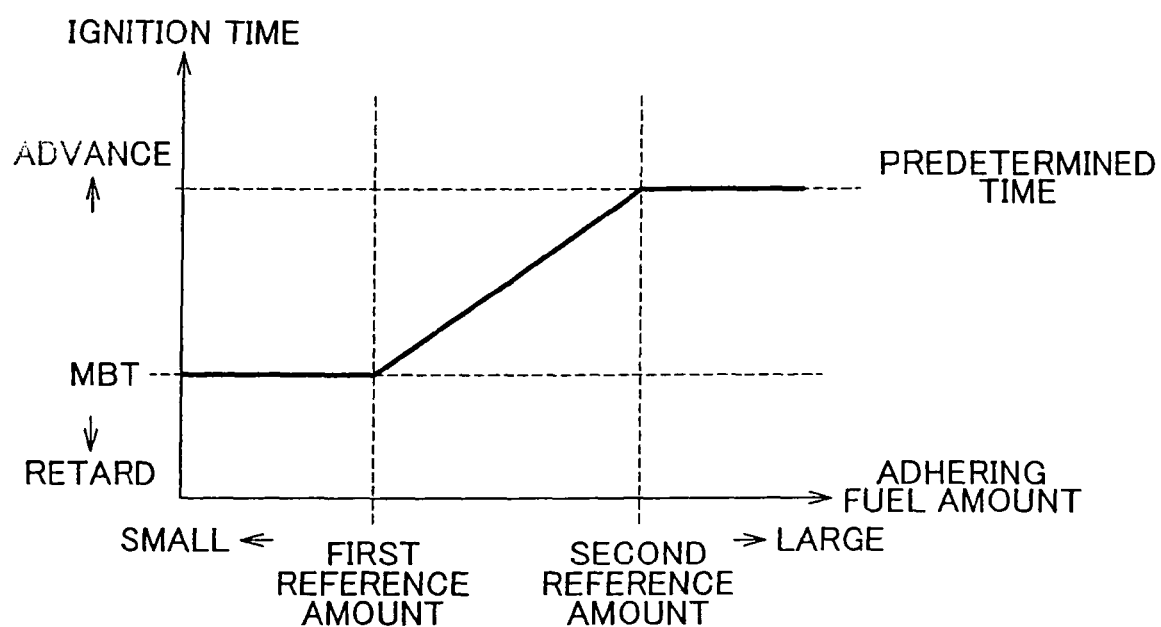
FIG. 27 is a chart illustrating the relation between the ignition time and the adhering fuel amount when the ignition time advancing amount is limited in the internal combustion engine according to the invention.

For example, as in the example illustrated in FIG. 27, the ECU 20 may be adapted to: fix the ignition time to the MBT when the adhering fuel amount Dpfuel is smaller than a first reference amount; advance the ignition time according to the adhering fuel amount Dpfuel when the adhering fuel amount Dpfuel is equal to or larger than the first reference amount but is smaller than a second reference amount; and fix the ignition time to the predetermined time when the adhering fuel amount Dpfuel is larger than the second reference amount.

The first reference amount may be equal to the "predetermined amount" recited in the first example embodiment or may be smaller than it. The second reference amount corresponds to the amount of adhering fuel that can be removed when the ignition time is set to the predetermined time in the map of FIG. 26.

Further, the predetermined time may be the standard ignition time, the torque limit ignition time, or the variation limit ignition time. Alternatively, the predetermined time may be the latest of at least two of the standard ignition time, the torque limit ignition time, and the variation limit ignition time.

Figure 28:
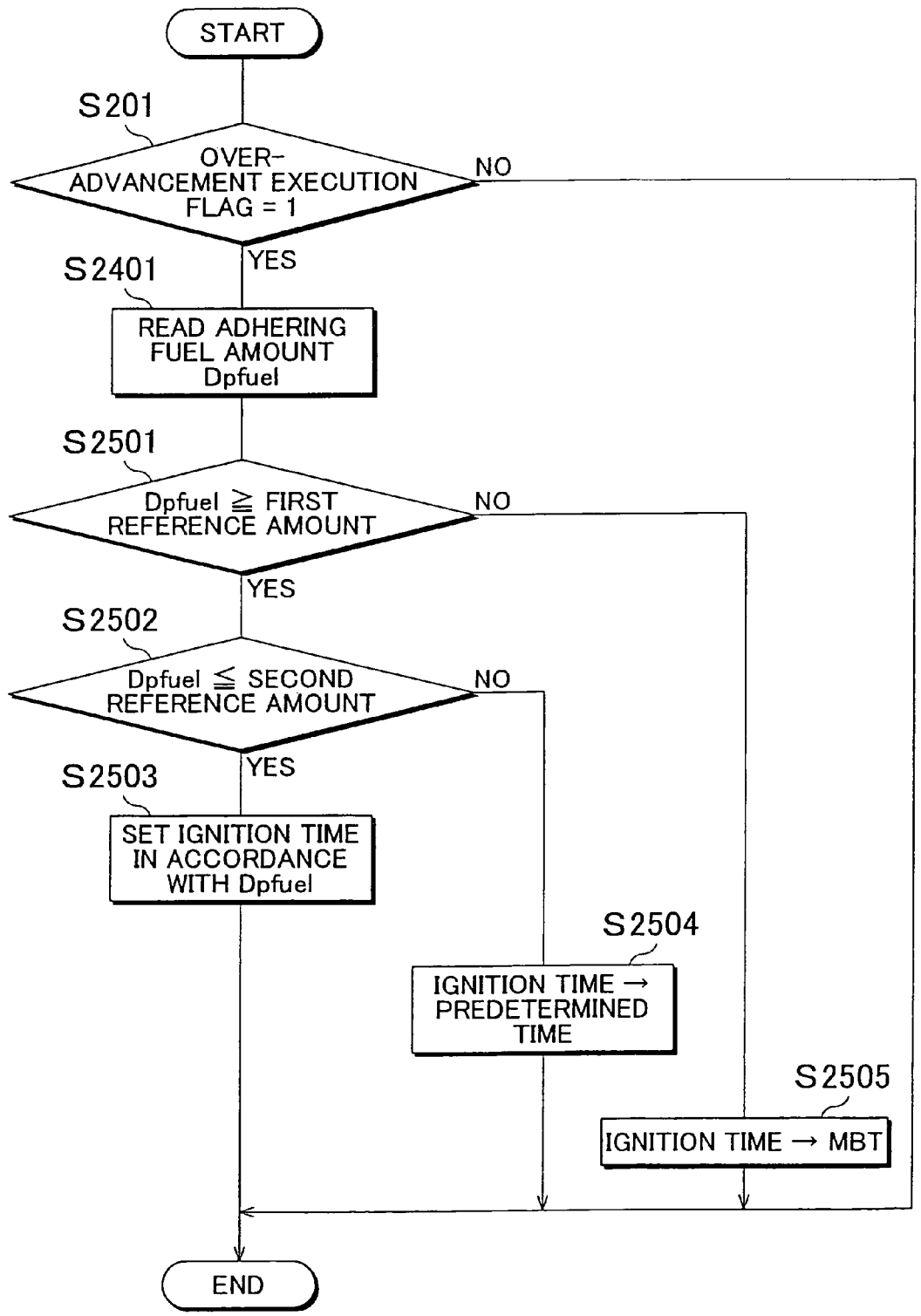
FIG. 28 is a flowchart illustrating another example of the ignition time advancing amount setting routine according to the sixth example embodiment of the invention.

To limit the over-advanced ignition time as descried above, for example, the ECU 20 may be adapted to determine the over-advanced ignition time by executing an advancing amount setting routine such as the one illustrated in FIG. 28. In the flowchart of FIG. 28, the steps that are the same as those of the advancing amount setting routine of FIG. 25 are denoted by the same numerals.

In the advancing amount setting routine of FIG. 28, the ECU 20 determines whether the over-advancement execution flag is presently set to "1" in step 201. If "YES" is obtained in step 201, the ECU 20 proceeds to step 2401 and reads the adhering fuel amount Dpfuel.

Then, the ECU 20 proceeds to step 2501 and determines the adhering fuel amount Dpfuel is equal to or larger than the first reference amount. If "NO" is obtained in step 2501 (Dpfuel<First Reference Amount), the ECU 20 proceeds to step 2505 and sets the ignition time to the MBT.

On the other hand, if "YES" is obtained in step 2501 (Dpfuel≧First Reference Amount), the ECU 20 then proceeds to step 2502. In step 2502, the ECU 20 determines whether the adhering fuel amount Dpfuel is equal to or smaller than the second reference amount.

If "YES" is obtained in step 2502 (Dpfuel≦Second Reference Amount), the ECU 20 then proceeds to step 2503 and sets the ignition time by applying the adhering fuel amount Dpfuel to the map of FIG. 26.

In this case, the ignition time advancing amount is set to an amount corresponding to the adhering fuel amount, and thus the reduction of the torque of the internal combustion engine 1 and the reduction of the fuel economy can be minimized.

On the other hand, if "NO" is obtained in step 2502 (Dpfuel>Second Reference Amount), the ECU 20 proceeds to step 2504 and fixes the ignition time to the predetermined time. That is, the ECU 20 sets the over-advanced ignition time to one of the standard ignition time, the torque limit ignition time, and the variation limit ignition time, or to the latest of at least two of the standard ignition time, the torque limit ignition time, and the variation limit ignition time.

As such, the ignition time is prevented from being advanced excessively, whereby the torque of the internal combustion engine 1 and the combustion state variation are prevented from being reduced excessively.

Seventh Example Embodiment

Figure 29:
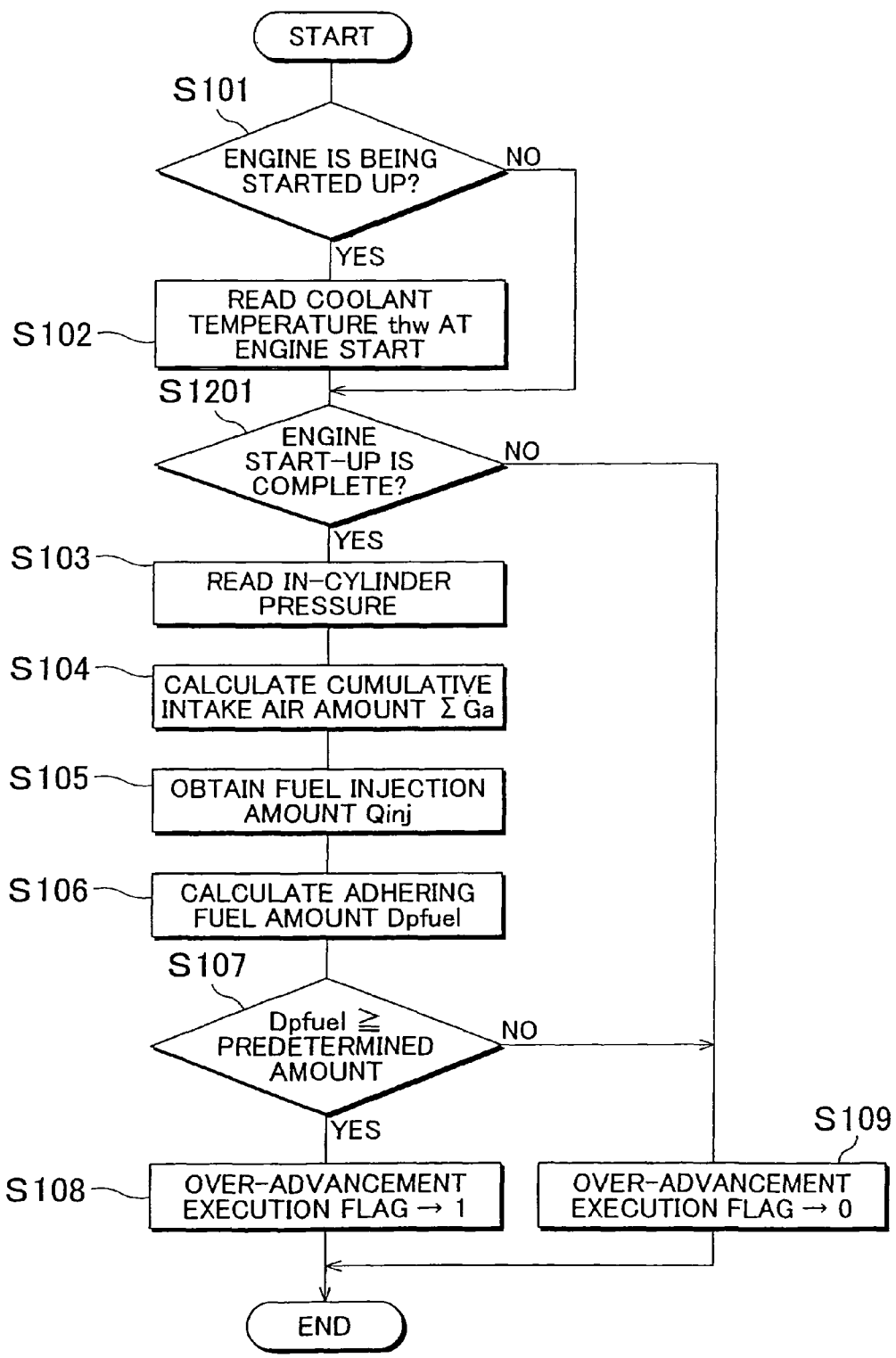
FIG. 29 is a flowchart illustrating an ignition time advancing amount setting routine according to the seventh example embodiment of the invention.

Next, an ignition control system according to the seventh example embodiment of the invention will be described with reference to FIG. 29. In the following description, only the differences from the foregoing first example embodiment will be described, that is, the structures of the ignition control system of the seventh example embodiment that are the same as those of the ignition control system of the first example embodiment will not be described again.

The seventh example embodiment is an embodiment of an ignition control system that executes the ignition time over-advancement after the start-up of the internal combustion engine 1 is completed.

During the ignition time over-advancement, the upward movement of the piston 15 is interfered with by the combustion pressure of air-fuel mixtures. Therefore, if the ignition time over-advancement is started before the start-up of the internal combustion engine 1 is completed, the interference of the combustion pressure (will be referred to as "negative torque" where necessary) to the upward movement of the piston 15 may hinder the starter device (e.g., starter motor, motor-generator) from operating properly.

Such interference to the operation of the starter device may lead to a difficulty in starting the internal combustion engine 1 quickly, and in bad cases, it may cause a starting failure.

This problem, however, can be prevented by starting the ignition time over-advancement after the start-up of the internal combustion engine 1 is completed.

Meanwhile, the start-up of the internal combustion engine 1 may be regarded as being complete when the internal combustion engine 1 has started to run with full combustion. Alternatively, if the ignition time advancing amount is small, the start-up of the internal combustion engine 1 may be regarded as being complete when the initial combustion occurs.

Hereinafter, the procedure of the adhering fuel reduction control of the seventh example embodiment will be described with reference to FIG. 29. FIG. 29 is a flowchart illustrating the advancing amount setting routine of the seventh example embodiment. In the flowchart of FIG. 29, the steps that are the same as those of the ignition time over-advancement execution determination routine of the first example embodiment (Refer to FIG. 12) are denoted by the same numerals.

In this routine, after executing step 102, the ECU 20 proceeds to step 1201 and determines whether the start-up of the internal combustion engine 1 has been completed. In this step, for example, the start-up of the internal combustion engine 1 is determined as having been completed if the engine speed Ne calculated based on the signal output from the crank position sensor 18 is equal to or higher than a predetermined speed.

If "YES" is obtained in step 1201, the ECU 20 executes step 103 and its subsequent steps. In this case, if the adhering fuel amount Dpfuel is equal to or larger than the predetermined amount, the ignition time over-advancement is executed.

On the other hand, if "NO" is obtained in step 1201, the ECU 20 then proceeds to step 109 and sets the over-advancement execution flag to "0". In this case, execution of the ignition time over-advancement is prohibited regardless of the adhering fuel amount Dpfuel.

According to the seventh example embodiment, as such, the ignition time over-advancement is not executed before the start-up of the internal combustion engine 1 is completed, and therefore the reduction of the startability of the internal combustion engine 1 that may otherwise be caused as a result of execution of the ignition time over-advancement can be prevented.

Note that the adhering fuel reduction control of the seventh example embodiment may be executed in various possible combinations with the adhering fuel reduction controls of the second to sixth example embodiments. By doing so, the amount of unburned fuel discharged from the cylinders 2 can be more efficiently reduced while minimizing the undesired effects of the ignition time over-advancement.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. An ignition control system for a spark ignition internal combustion engine, comprising:
    an over-advancing portion configured to over-advance an ignition time for a cylinder of the internal combustion engine beyond an MBT;
    an obtaining portion configured to obtain an adhering fuel amount that is the amount of fuel that adheres to the inner face of the cylinder of the internal combustion engine; and
    a controller configured to control the over-advancing portion to execute the ignition time over-advancement when the adhering fuel amount obtained by the obtaining portion is equal to or larger than a predetermined amount.

2. An ignition control system for a spark ignition internal combustion engine, comprising:
    an over-advancing portion configured to over-advance an ignition time for a cylinder of the internal combustion engine beyond an MBT;
    an obtaining portion configured to obtain an adhering fuel amount that is the amount of fuel that adheres to the inner face of the cylinder of the internal combustion engine; and
    a controller configured to change an ignition time over-advancing amount, which is the amount by which the over-advancing portion advances the ignition time, in accordance with the adhering fuel amount obtained by the obtaining portion.

3. The ignition control system according to claim 1, wherein
    the larger the adhering fuel amount obtained by the obtaining portion, the larger the controller makes an ignition time over-advancing amount that is the amount by which the over-advancing portion advances the ignition time.

4. The ignition control system according to claim 1, wherein
    the controller sets the ignition time over-advancing amount such that combustion of air-fuel mixture in the cylinder ends at a time point near a compression stroke top dead center.

5. The ignition control system according to claim 1, wherein
    the controller sets the ignition time over-advancing amount such that the pressure in the cylinder reaches a maximum value at a time point near the compression stroke top dead center.

6. The ignition control system according to claim 1, wherein
    the controller sets the ignition time over-advancing amount such that the temperature in the cylinder reaches a maximum value at a time point near the compression stroke top dead center.

7. The ignition control system according to claim 2, wherein
    the larger the adhering fuel amount obtained by the obtaining portion, the larger the controller makes the ignition time over-advancing amount.

8. The ignition control system according to claim 2, wherein
    the controller limits the ignition time over-advancing amount such that combustion of air-fuel mixture in the cylinder ends at or after a time point near a compression stroke top dead center.

9. The ignition control system according to claim 2, wherein
    the controller limits the ignition time over-advancing amount such that the pressure in the cylinder reaches a maximum value at or after a time point near the compression stroke top dead center.

10. The ignition control system according to claim 2, wherein
    the controller limits the ignition time over-advancing amount such that the temperature in the cylinder reaches a maximum value at or after a time point near the compression stroke top dead center.

11. The ignition control system according to claim 1, wherein
    the controller prohibits the over-advancing portion from executing the ignition time over-advancement when the air-fuel ratio of an air-fuel mixture combusted in the cylinder is fuel-lean.

12. The ignition control system according to claim 1, wherein
    the controller prohibits the over-advancing portion from executing the ignition time over-advancement when the load of the internal combustion engine is equal to or larger than a predetermined load.

13. The ignition control system according to claim 1, further comprising:
    a fuel injection valve for injecting fuel into an intake port of the internal combustion engine, wherein
    when the ignition time over-advancement is executed by the over-advancing portion, the controller sets the fuel injection time of the fuel injection valve to a time point synchronous with an intake stroke.

14. The ignition control system according to claim 1 further comprising:
    a fuel injection valve for injecting fuel into an intake port of the internal combustion engine, wherein
    the controller switches the fuel injection time of the fuel injection valve to a time point synchronous with an intake stroke after the over-advancing portion starts executing the ignition time over-advancement.

15. The ignition control system according to claim 1, wherein
    the controller gradually changes the ignition time when starting the ignition time over-advancement by the over-advancing portion and/or when finishing the ignition time over-advancement by the over-advancing portion.

16. The ignition control system according to claim 1, wherein
    the controller adjusts an intake air amount while the ignition time over-advancement is being executed by the over-advancing portion.

17. The ignition control system according to claim 1, wherein
    the controller calculates a combustion state variation rate from the pressure in the cylinder and corrects an ignition time over-advancing amount such that the combustion state variation rate becomes equal to or lower than a threshold.

18. The ignition control system according to claim 2, wherein the controller prohibits the over-advancing portion from executing the ignition time over-advancement when the air-fuel ratio of an air-fuel mixture combusted in the cylinder is fuel-lean.

19. The ignition control system according to claim 2, wherein
the controller prohibits the over-advancing portion from executing the ignition time over-advancement when the load of the internal combustion engine is equal to or larger than a predetermined load.

20. The ignition control system according to claim 2, further comprising:
a fuel injection valve for injecting fuel into an intake port of the internal combustion engine, wherein
when the ignition time over-advancement is executed by the over-advancing portion, the controller sets the fuel injection time of the fuel injection valve to a time point synchronous with an intake stroke.

21. The ignition control system according to claim 2, further comprising:
a fuel injection valve for injecting fuel into an intake port of the internal combustion engine, wherein
the controller switches the fuel injection time of the fuel injection valve to a time point synchronous with an intake stroke after the over-advancing portion starts executing the ignition time over-advancement.

22. The ignition control system according to claim 2, wherein
the controller gradually changes the ignition time when starting the ignition time over-advancement by the over-advancing portion and/or when finishing the ignition time over-advancement by the over-advancing portion.

23. The ignition control system according to claim 2, wherein
the controller adjusts an intake air amount while the ignition time over-advancement is being executed by the over-advancing portion.

24. The ignition control system according to claim 2, wherein
the controller calculates a combustion state variation rate from the pressure in the cylinder and corrects an ignition time over-advancing amount such that the combustion state variation rate becomes equal to or lower than a threshold.

25. The ignition control system according to claim 1, wherein
the obtaining portion is configured to obtain the adhering fuel amount by measuring or detecting the adhering fuel amount.

26. The ignition control system according to claim 2, wherein
the obtaining portion is configured to obtain the adhering fuel amount by measuring or detecting the adhering fuel amount.

* * * * *